(12) United States Patent
Tabata et al.

(10) Patent No.: US 6,342,950 B1
(45) Date of Patent: Jan. 29, 2002

(54) METHOD AND APPARATUS FOR ENCODING IMAGE, IMAGE DECODING APPARATUS AND IMAGE FORMING APPARATUS

(75) Inventors: Sunao Tabata, Yokohama; Naofumi Yamamoto, Tokyo; Gururaj Rao, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/138,284

(22) Filed: Aug. 21, 1998

(30) Foreign Application Priority Data

Aug. 21, 1997 (JP) .............................................. 9-224923

(51) Int. Cl.[7] .............................................. H04N 1/047
(52) U.S. Cl. .......................... 358/1.6; 358/462; 358/1.1; 382/167
(58) Field of Search ................................ 382/176, 251, 382/252, 9, 273; 358/462, 465, 466, 539, 1.16, 1.1, 280, 469; 348/405

(56) References Cited

U.S. PATENT DOCUMENTS

| 4,547,811 A | * | 10/1985 | Ochi et al. ................... 358/280 |
| 5,220,440 A | | 6/1993 | Hisatake ..................... 358/433 |
| 5,539,843 A | * | 7/1996 | Murakami et al. .......... 382/270 |
| 5,570,432 A | * | 10/1996 | Kojima ........................ 382/254 |
| 6,005,623 A | * | 12/1999 | Takahashi et al. .......... 348/402 |
| 6,115,504 A | * | 9/2000 | Kumashiro ................. 382/273 |

FOREIGN PATENT DOCUMENTS

| JP | 9-83806 | 3/1997 | ............ H04N/1/41 |

* cited by examiner

Primary Examiner—Jerome Grant, II
Assistant Examiner—Kevin C Kianni
(74) Attorney, Agent, or Firm—Foley & Lardner

(57) ABSTRACT

An image processing apparatus including an identification circuit for identifying the type of acquired image information, a determination circuit for determining resolution and the number of quantization steps according to the result of identification and a quantization circuit for quantizing the image information using an error diffusion process based on the determined resolution and the number of quantization steps.

11 Claims, 40 Drawing Sheets

BLOCK SIZE FOR RESOLUTION-ORIENTED ENCODING

A–D: QUADRUPLE VALUE
BINARY REPRESENTATION: 1 BIT×4

| IDENTIFICATION | A | B | C | D |
|---|---|---|---|---|
| 0 | 0 | 00 | 00 | 00 | 00 |
| 1 | 0 | 00 | 00 | 00 | 01 |
| 2 | 0 | 00 | 00 | 00 | 10 |
| 3 | 0 | 00 | 00 | 00 | 11 |
| 4 | 0 | 00 | 00 | 01 | 00 |
| 5 | 0 | 00 | 00 | 01 | 01 |
| 252 | 0 | 00 | 11 | 11 | 11 |
| 253 | 0 | 01 | 11 | 11 | 11 |
| 254 | 0 | 10 | 11 | 11 | 11 |
| 255 | 0 | 11 | 11 | 11 | 11 |

RESOLUTION-ORIENTED CODE
1 IDENTIFICATION BIT+8 TONE VALUE BITS:TOTAL 9 BITS

FIG. 10A

BLOCK SIZE FOR TONE-ORIENTED ENCODING

A: HEXADECIMAL VALUE
BINARY REPRESENTATION: 4 BITS

| IDENTIFICATION | A |
|---|---|
| 0 | 1 0000 **** |
| 1 | 1 0001 **** |
| 2 | 1 0010 **** |
| 3 | 1 0011 **** |
| 4 | 1 0100 **** |
| 5 | 1 0101 **** |
| 12 | 1 1100 **** |
| 13 | 1 1101 **** |
| 14 | 1 1110 **** |
| 15 | 1 1111 **** |

TONE-ORIENTED CODE
1 IDENTIFICATION BIT+4 TONE VALUE BITS:TOTAL 5 BITS
(* IS DUMMY)

FIG. 10B

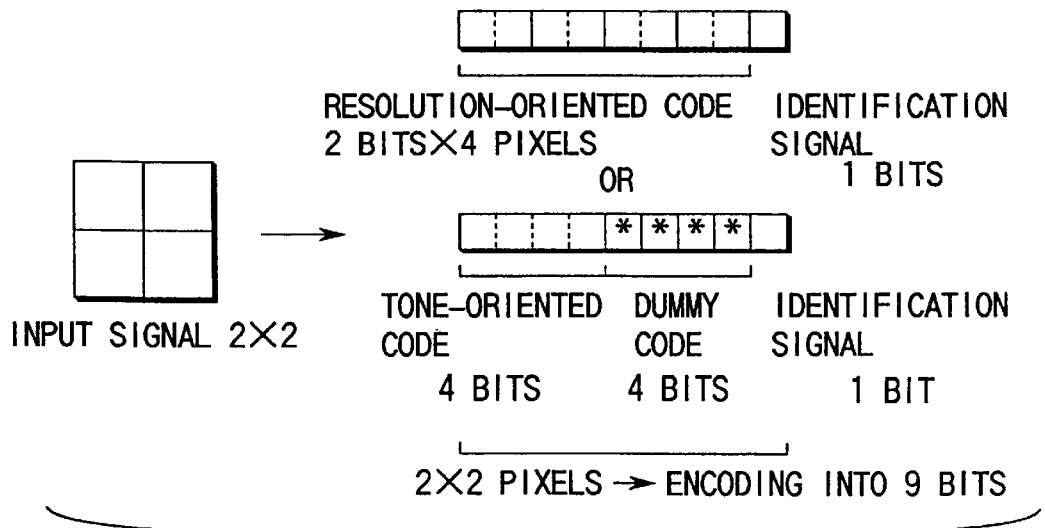

FIG. 11

BLOCK SIZE FOR RESOLUTION-ORIENTED ENCODING

A–D: QUADRUPLE VALUE
BINARY REPRESENTATION: 1 BIT×4

| IDENTIFICATION | A | B | C | D |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |

RESOLUTION-ORIENTED CODE
1 IDENTIFICATION BIT+4 TONE VALUE BITS: TOTAL 5 BITS

FIG. 12A

BLOCK SIZE FOR TONE-ORIENTED ENCODING

A: HEXADECIMAL VALUE
BINARY REPRESENTATION: 4 BITS

| IDENTIFICATION | A |
|---|---|
| 0 | 1  0000 |
| 1 | 1  0001 |
| 2 | 1  0010 |
| 3 | 1  0011 |
| 4 | 1  0100 |
| 5 | 1  0101 |
| 12 | 1  1100 |
| 13 | 1  1101 |
| 14 | 1  1110 |
| 15 | 1  1111 |

TONE-ORIENTED CODE
1 IDENTIFICATION BIT+4 TONE VALUE BITS: TOTAL 5 BITS

FIG. 12B

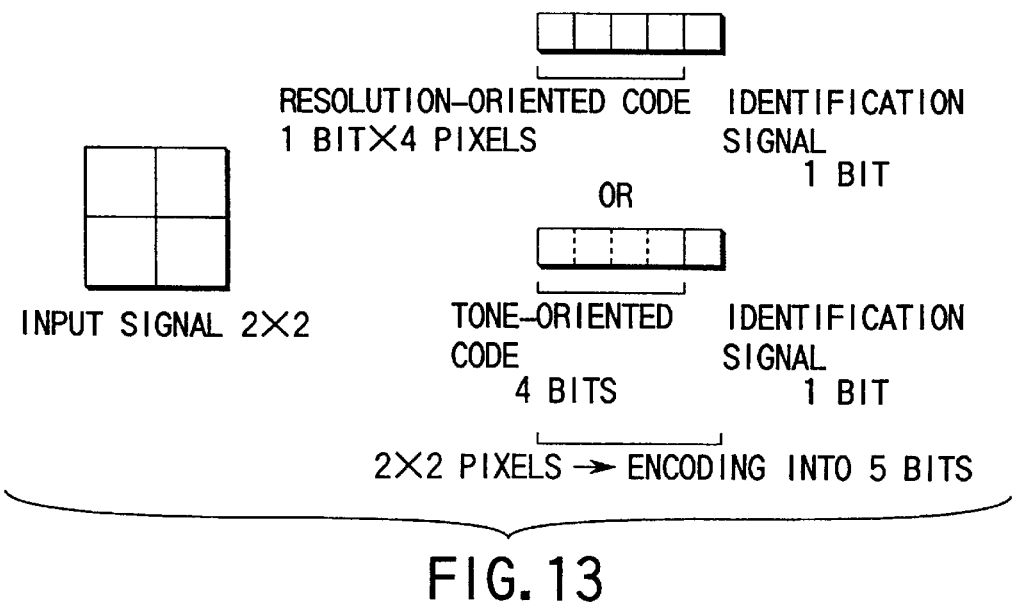

FIG. 13

{ BLOCK SIZE FOR RESOLUTION-ORIENTED ENCODING

A–D: QUADRUPLE VALUE BINARY REPRESENTATION: 2 BITS×4

| IDENTIFICATION | | A B C D |
|---|---|---|
| 0 | 0 | 00 00 00 00 |
| 1 | 0 | 00 00 00 01 |
| 2 | 0 | 00 00 00 10 |
| 3 | 0 | 00 00 00 11 |
| 4 | 0 | 00 00 01 00 |
| 5 | 0 | 00 00 01 01 |
| 252 | 0 | 00 11 11 11 |
| 253 | 0 | 01 11 11 11 |
| 254 | 0 | 10 11 11 11 |
| 255 | 0 | 11 11 11 11 |

RESOLUTION-ORIENTED CODE
1 IDENTIFICATION BIT+
8 TONE VALUE BIT:
TOTAL 9 BITS

FIG. 14A

{ BLOCK SIZE FOR TONE-ORIENTED ENCODING

A, B: HEXADECIMAL VALUE BINARY REPRESENTATION: 4 BIT EACH

| IDENTIFICATION | | A B |
|---|---|---|
| 0 | 1 | 0000 0000 |
| 1 | 1 | 0000 0001 |
| 2 | 1 | 0000 0010 |
| 3 | 1 | 0000 0011 |
| 4 | 1 | 0000 0100 |
| 5 | 1 | 0000 0101 |
| 252 | 1 | 1111 1100 |
| 253 | 1 | 1111 1101 |
| 254 | 1 | 1111 1110 |
| 255 | 1 | 1111 1111 |

TONE-ORIENTED CODE
1 IDENTIFICATION BIT+
4 TONE VALUE BITS+
4 TONE VALUE BITS:
TOTAL 9 BITS

FIG. 14B

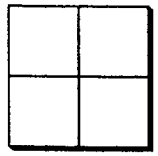

INPUT SIGNAL 2×2

RESOLUTION-ORIENTED CODE
2 BITS×4 PIXELS

OR

TONE-ORIENTED CODE
4 BITS×2 PIXELS

IDENTIFICATION SIGNAL 1 BIT

IDENTIFICATION SIGNAL 1 BIT

2×2 PIXELS → ENCODING INTO 9 BITS

FIG. 15

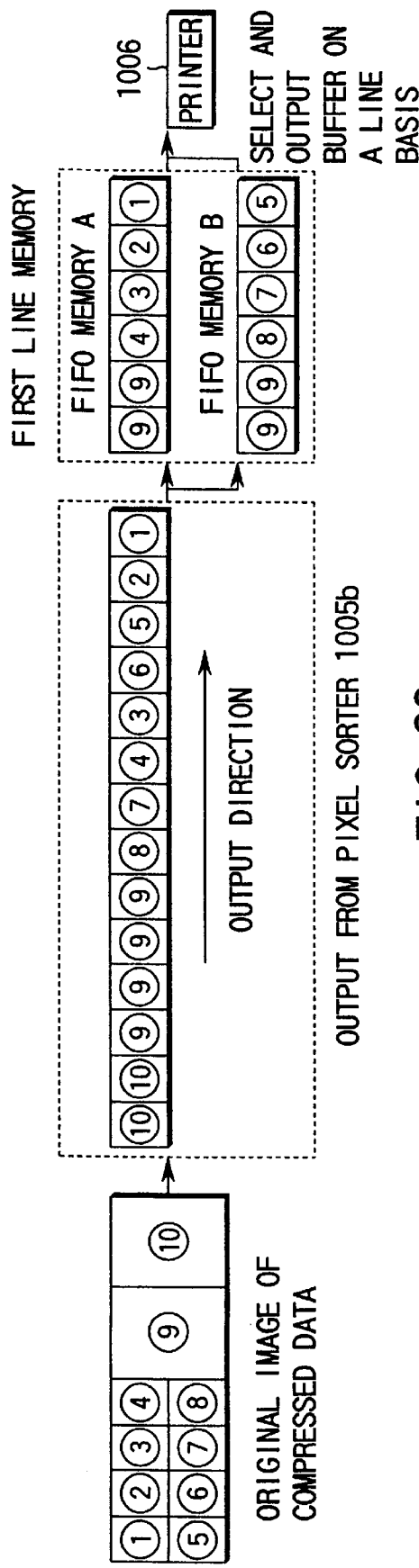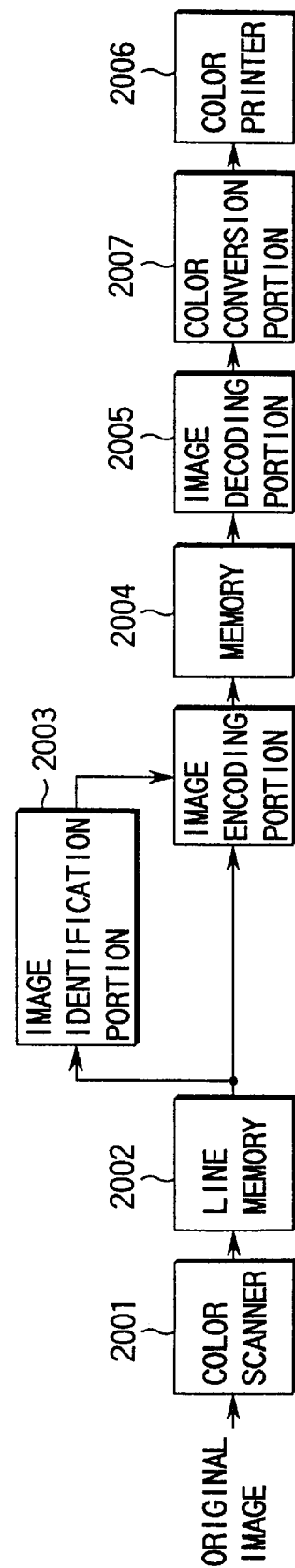
FIG. 20
FIG. 22

| 0 BLOCK CODE 9 BITS | . . . . | 6 BLOCK CODE 9 BITS | DUMMY 1 BIT |

7 BLOCKS=9 BITS×7=63 BITS
+1 DUMMY BIT=64 BITS (8 BYTES)

FIG. 21A

| 0 BLOCK (8 BITS) | . . | 6 BLOCK CODE (8 BITS) | IDENTIFICATION BIT OF EACH BLOCK+DUMMY (8 BITS) |

8 BITS OTHER THAN IDENTIFICATION INFORMATION
OF EACH BLOCK×7 BLOCKS=56 BITS
+IDENTIFICATION OF EACH BLOCK (7 BITS)+
1 DUMMY BIT=64 BITS (8 BYTES)

FIG. 21B

| 0 BLOCK (8 BITS) | . . | 7 BLOCK CODE (8 BITS) | IDENTIFICATION BIT OF EACH BLOCK (8 BITS) |

8 BITS OTHER THAN IDENTIFICATION INFORMATION
OF EACH BLOCK×8 BLOCKS=64 BITS
+IDENTIFICATION OF EACH BLOCK (8 BITS)=72 BITS (9 BYTES)

FIG. 21C

ORIGINAL COLOR
DIFFERENCE SIGNAL

| 23 | 32 | 31 | 28 | 32 | 27 | 31 | 33 |
|----|----|----|----|----|----|----|----|
| 31 | 30 | 32 | 29 | 29 | 32 | 30 | 31 |
| 30 | 28 | 31 | 28 | 25 | 31 | 28 | 32 |
| 27 | 29 | 31 | 34 | 34 | 22 | 25 | 27 |

AVERAGE COLOR DIFFERENCE
SIGNAL FOR BLOCKS

| 29 | 30 | 30 | 31 |
|----|----|----|----|
| 28 | 31 | 29 | 28 |

ERROR PROPAGATION
OF COLOR DIFFERENCE
SIGNAL

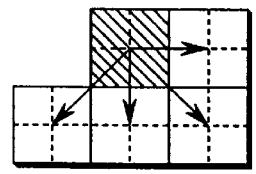

THRESHOLD  REPRESENTATIVE VALUE
(QUANTIZATION VALUE)

TABLE FOR CONVERTING I SIGNAL
INTO 11 QUANTIZATION VALUES

THRESHOLD  REPRESENTATIVE VALUE
(QUANTIZATION VALUE)

TABLE FOR CONVERTING Q SIGNAL
INTO 11 QUANTIZATION VALUES

BLOCK SIZE FOR RESOLUTION-ORIENTED ENCODING FOR Y SIGNAL

```
| A | B |
| C | D |
```

A–D: QUADRUPLE VALUE
BINARY REPRESENTATION: 2 BITS×4

| IDENTIFI-CATION | A | B | C | D |
|---|---|---|---|---|
| 0 | 0 | 00 | 00 | 00 | 00 |
| 1 | 0 | 00 | 00 | 00 | 01 |
| 2 | 0 | 00 | 00 | 00 | 10 |
| 3 | 0 | 00 | 00 | 00 | 11 |
| 4 | 0 | 00 | 00 | 01 | 00 |
| 5 | 0 | 00 | 00 | 01 | 01 |
| ⋮ | | | | | |
| 252 | 0 | 00 | 11 | 11 | 11 |
| 253 | 0 | 01 | 11 | 11 | 11 |
| 254 | 0 | 10 | 11 | 11 | 11 |
| 255 | 0 | 11 | 11 | 11 | 11 |

RESOLUTION-ORIENTED CODE FOR Y SIGNAL
1 IDENTIFICATION BIT + 8 TONE VALUE BIT: TOTAL 9 BITS

FIG. 29B

BLOCK SIZE FOR TONE-ORIENTED ENCODING FOR Y SIGNAL

```
| A |         | A | B |
| B |   OR    |   |   |
```

A, B: HEXADECIMAL VALUE
BINARY REPRESENTATION: 4 BIT EACH

| IDENTIFI-CATION | A | B |
|---|---|---|
| 0 | 1 | 0000 | 0000 |
| 1 | 1 | 0000 | 0001 |
| 2 | 1 | 0000 | 0010 |
| 3 | 1 | 0000 | 0011 |
| 4 | 1 | 0000 | 0100 |
| 5 | 1 | 0000 | 0101 |
| ⋮ | | | |
| 252 | 1 | 1111 | 1100 |
| 253 | 1 | 1111 | 1101 |
| 254 | 1 | 1111 | 1110 |
| 255 | 1 | 1111 | 1111 |

TONE-ORIENTED CODE FOR Y SIGNAL
1 IDENTIFICATION BIT + 8 TONE VALUE BITS: TOTAL 9 BITS

FIG. 29C

BLOCK SIZES FOR ENCODING IQ SIGNAL A, B:

```
| A |        | B |
```
I SIGNAL    Q SIGNAL

ELEVEN VALUES
BINARY REPRESENTATION:
A×B=121 → 7 BITS

| A | B | CODE |
|---|---|---|
| 0 | 0 | 0000000 |
| 0 | 1 | 0000001 |
| 0 | 2 | 0000010 |
| 0 | 3 | 0000011 |
| 0 | 4 | 0000100 |
| 0 | 5 | 0000101 |
| ⋮ | ⋮ | ⋮ |
| 10 | 7 | 1111001 |
| 10 | 8 | 1111010 |
| 10 | 9 | 1111011 |
| 10 | 10 | 1111100 |

CODE FOR COMBINED IQ SIGNAL: 7 BITS

FIG. 48A

BLOCK SIZE FOR RESOLUTION-ORIENTED ENCODING FOR C AND M SIGNALS

```
┌─┬─┐
│A│B│  A-D: QUADRUPLE VALUE
├─┼─┤  BINARY REPRESENTATION:
│C│D│  2 BITS×4
└─┴─┘
```

| IDENTIFI-CATION | A B C D |
|---|---|
| 0 | 0 | 00 00 00 00 |
| 1 | 0 | 00 00 00 01 |
| 2 | 0 | 00 00 00 10 |
| 3 | 0 | 00 00 00 11 |
| 4 | 0 | 00 00 01 00 |
| 5 | 0 | 00 00 01 01 |
| ⋮ | | |
| 252 | 0 | 00 11 11 11 |
| 253 | 0 | 01 11 11 11 |
| 254 | 0 | 10 11 11 11 |
| 255 | 0 | 11 11 11 11 |

RESOLUTION-ORIENTED CODE FOR C AND M SIGNALS
1 IDENTIFICATION BIT+ 8 TONE VALUE BITS: TOTAL 9 BITS

FIG. 48B

BLOCK SIZE FOR TONE-ORIENTED ENCODING FOR C AND M SIGNALS

```
┌─┬─┐      ┌─┐
│A│B│  OR  │A│    A,B: HEXADECIMAL VALUE
└─┴─┘      ├─┤    BINARY REPRESENTATION:
           │B│    4 BIT EACH
           └─┘
```

| IDENTIFI-CATION | A | B |
|---|---|---|
| 0 | 1 | 0000 0000 |
| 1 | 1 | 0000 0001 |
| 2 | 1 | 0000 0010 |
| 3 | 1 | 0000 0011 |
| 4 | 1 | 0000 0100 |
| 5 | 1 | 0000 0101 |
| ⋮ | | |
| 252 | 1 | 1111 1100 |
| 253 | 1 | 1111 1101 |
| 254 | 1 | 1111 1110 |
| 255 | 1 | 1111 1111 |

TONE-ORIENTED CODE FOR C AND M SIGNALS
1 IDENTIFICATION BIT+8 TONE VALUE BITS: TOTAL 9 BITS

FIG. 48C

BLOCK SIZES FOR ENCODING Y SIGNAL

```
┌─┬─┐      ┌─┬─┐
│A│B│      │A│B│   A,B: ELEVEN VALUES
└─┴─┘      └─┴─┘   BINARY REPRESENTATION:
                   A×B=121
                   → 7 BITS
```

| A | B | CODE |
|---|---|---|
| 0 | 0 | 0000000 |
| 0 | 1 | 0000001 |
| 0 | 2 | 0000010 |
| 0 | 3 | 0000011 |
| 0 | 4 | 0000100 |
| 0 | 5 | 0000101 |
| ⋮ | | |
| 10 | 7 | 1111001 |
| 10 | 8 | 1111010 |
| 10 | 9 | 1111011 |
| 10 | 10 | 1111100 |

CODE FOR COMBINED Y SIGNAL: 7 BITS

| INPUT | | | OUTPUT | | |
|---|---|---|---|---|---|
| C | M | Y | C' | M' | Y' |
| 0 | 0 | 0 | 0 | 0 | 0 |
| 0 | 0 | 1 | 0 | 0 | 0 |
| 0 | 0 | 2 | 0 | 0 | 1 |
| ⋮ | | | | | |
| 255 | 255 | 253 | 255 | 255 | 254 |
| 255 | 255 | 254 | 255 | 255 | 255 |
| 255 | 255 | 255 | 255 | 255 | 255 |

FIG. 50  COLOR REPRODUCTION RANGE LUT

THRESHOLD REPRESENTATIVE VALUE (QUANTIZATION VALUE)
TABLE FOR CONVERTING I SIGNAL INTO 11 QUANTIZATION VALUES

THRESHOLD REPRESENTATIVE VALUE (QUANTIZATION VALUE)
TABLE FOR CONVERTING Q SIGNAL INTO 11 QUANTIZATION VALUES

METHOD AND APPARATUS FOR ENCODING IMAGE, IMAGE DECODING APPARATUS AND IMAGE FORMING APPARATUS

BACKGROUND OF THE INVENTION

The present invention relates to a digital color copier for forming an image based on an image signal read by, for example, a scanner.

In conventional apparatuses such as facsimile machines and printers which output images, an image is compressed by using an image compression/decompression technique to utilize a transmission path and a memory effectively.

With convention compression techniques, the amount of compressed data has varied depending on the image to be compressed because such techniques have been essentially intended for compressing each image to a size as small as possible.

However, apparatuses for handling images include devices such as page memories in printers and copiers and video memories in displays for which it is important to treat all images as having the same size in consideration to the system configuration. Such apparatuses have relied upon compression techniques on a fixed length basis which always compress any image into a fixed size with a small working buffer size. Conventional techniques which satisfy such a requirement exists, for example, U.S. Pat. No. 5,220,440. This U.S.P. has disclosed the technique in that the quantization is performed corresponding to the gradation of the character, and the image data is quantized into the data of the consistent data format. However, because the technique disclosed in the U.S.P. discriminates the image not for the character and the photograph, it occasionally happens that the image can not obtain sufficient resolution and gradation for the character image area and the photograph image area respectively and simultaneously.

BRIEF SUMMARY OF THE INVENTION

It is an object of the present invention to provide a method and apparatus for compressing an image in which required resolution and tone characteristics are maintained depending on the type of the image and in which compressed data can be obtained in a consistent data format with a constant compression ratio maintained.

It is another object of the present invention to provide a method for encoding an image in which encoding can be easily performed on a fixed length basis with a high compression ration and less deterioration of image quality and in which reverse variable length compression can be carried out even after fixed length compression, an image encoding apparatus and an apparatus for decoding encoded data using the same method.

It is still another object of the invention to provide an image encoding apparatus and an apparatus for decoding encoded data in which a high resolution image can be compressed at a high compression ration with less deterioration of image quality attributable to compression in a small scale circuit; the compression gives less influence on image quality even in an unstable output device; deterioration attributable to compression can be suppressed even in an apparatus having different color reproduction rates for the input and output signals; an apparatus for inputting and outputting image can prevent deterioration increasing output signal more than input signal; editing can be performed with a small circuit scale; and reverse variable length compression can be carried out even after fixed length compression.

It is still another object of the present invention to use such an image encoding apparatus and image decoding apparatus to provide an image forming apparatus in which memory resources can be effectively utilized and in which the efficiency of an image forming process can be improved.

According to a first embodiment of the invention, there is provided an image forming apparatus comprises means for storing image information; means for identifying types of images from the stored image information; means for determining resolution and the number of quantization steps in accordance with the result of identification; and means for quantizing the image information through an error diffusion process on at least one of the types of images based on the resolution and number of quantization steps determined by the determination means.

The present invention having the above-described structure allows the resolutions and numbers of quantization steps of, for example, a photographic image and a character image to be determined with priority given to tone characteristics for the photographic image and to resolution for the character image instead of compressing the image information at one compression ratio as in the prior art. The image information is quantized through an error diffusion process based on the resolutions and the numbers of quantization steps. This makes it possible to compress the image as a whole at a compression ratio of a consistent level while maintaining required tone characteristics for the photograph and required resolution for the character information. Further, since an error diffusion process is performed on at least the photographic image, high tone characteristics can be maintained in microscopic regions thereof. It is noted further that an image can be reproduced preferably as a whole even when the error diffusion process is carried out only in photographic regions and not in regions of characters and line arts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 10A and 10B are diagrams illustrating an example of a code table used for encoding provided in the fixed length encoding circuit;

FIG. 11 is a diagram illustrating an example of the configuration of a fixed length (9 bits) code generated in the fixed length encoding circuit;

FIGS. 12A and 12B are diagrams illustrating another example of the code table for encoding provided in the fixed length encoding circuit;

FIG. 13 is a diagram illustrating an example of the configuration of a fixed length (5 bits) code generated in the fixed length encoding circuit;

FIGS. 14A and 14B are diagrams illustrating still another example of the code table for encoding provided in the fixed length encoding circuit;

FIG. 15 is a diagram illustrating another example of the configuration of a fixed length (9 bits) code generated in the fixed length encoding circuit;

FIG. 20 is a diagram illustrating a method for outputting image data from the image decoding portion to a printer;

FIGS. 21A, 21B and 21C are diagrams illustrating examples of the configuration of access units for a fixed length code;

FIG. 22 is diagram schematically illustrating an example of the configuration of a digital color copier according to a second embodiment of the present invention;

FIGS. 27A, 27B and 27C are diagrams illustrating an error diffusion process on IQ signal;

FIGS. 28A and 28B are diagrams illustrating examples of a quantization table used for quantizing an I signal and a quantization table used for quantizing a Q signal;

FIGS. 29A, 29B and 29C are diagrams illustrating examples of code tables respectively used for encoding brightness and color signal provided in the fixed length encoding circuit;

FIGS. 48A, 48B and 48C are diagrams illustrating a process for compression (encoding) on a CMY space in the image encoding portion;

FIG. 50 is a diagram illustrating an example of a conversion table on a CMY space for correcting color reproduction ranges used in an RGB/CMY conversion portion.

DETAILED DESCRIPTION OF THE INVENTION

Preferred embodiments of the present invention will be described with reference to the drawings hereinafter.

A First Embodiment

Figure 1:
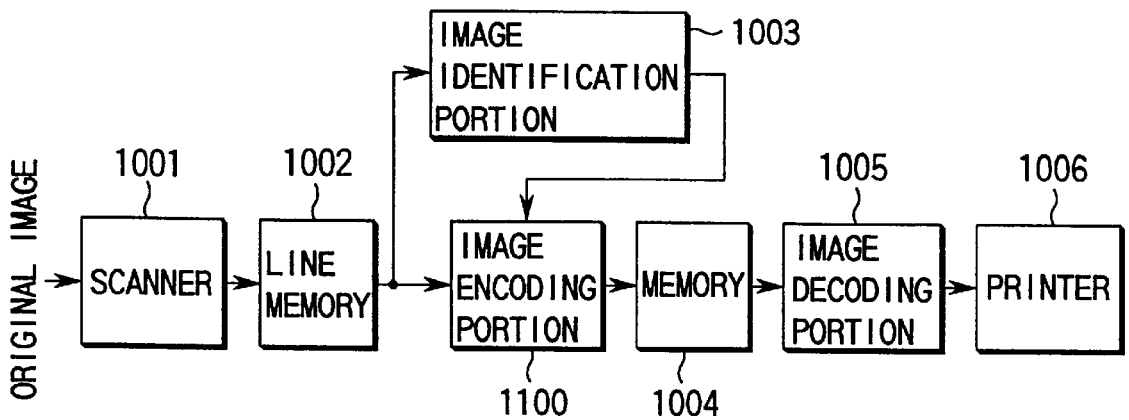
FIG. 1 is a block diagram schematically illustrating an example of the configuration of major parts of a digital copier according to a first embodiment of the present invention.

FIG. 1 is a block diagram schematically illustrating an example of the configuration of major parts of a digital copier which is an image forming apparatus employing an image encoding/decoding apparatus according to the present invention. The digital copier comprises a scanner 1001 for reading an original image as multi-value image data, a line memory 1002 for storing input image data line by line, an image identification portion 1003 for identifying an image block by block, an image encoding portion 1100 for encoding data which has been divided into blocks, a memory 1004 for temporarily storing the encoded data, an image decoding portion 1005 for decoding the encoded data in blocks pixel by pixel and a printer 1006.

A process performed by this digital copier will be schematically described. A basic operation of the digital copier is to read a source image to be copied with the scanner 1001 and convert it into multi-value image data which is in turn output by the printer 1006 to provide a copy of the original image.

Figure 2:
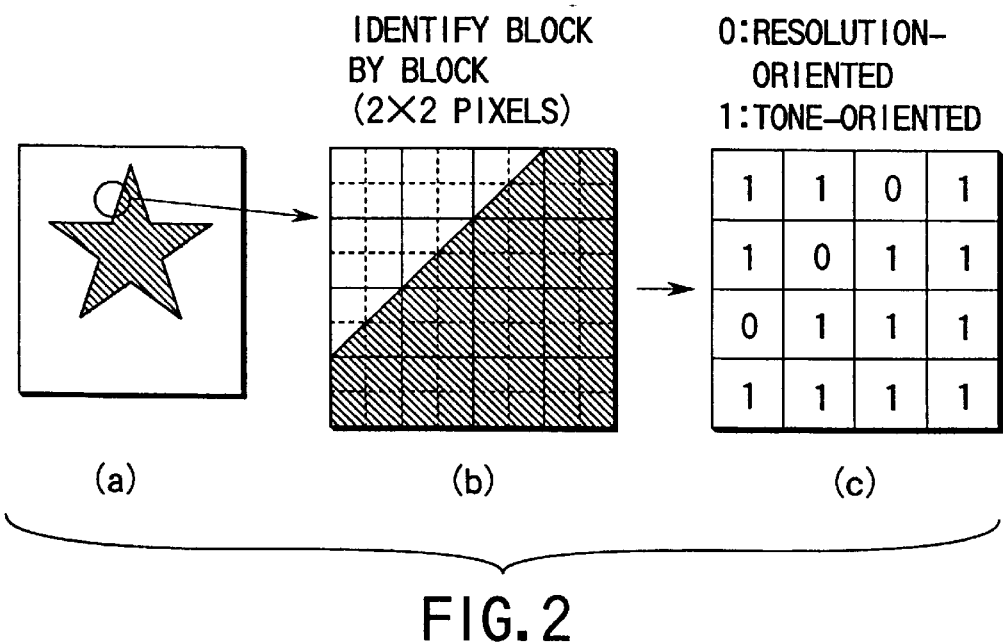
FIG. 2 is a diagram illustrating an operation of an image identification portion.

Next, an operation of the image identification portion 1003 will be described with reference to FIG. 2. The image identification portion 1003 reads, for example, image data from the line memories A and B of the line memory 1002 in 2×2 blocks each of which consisting of a0, a1, b0 and b1 identifies the data as to whether it is an image such as a character for which priority is given to resolution over tone characteristics or an image such as a photograph for which priority is given to tone characteristics over resolution based on density distribution in the block and neighboring pixels and outputs the result of identification for each block, as an image identification signal, to an image encoding portion 1100 through an identification signal line memory 1003a.

Figure 3:
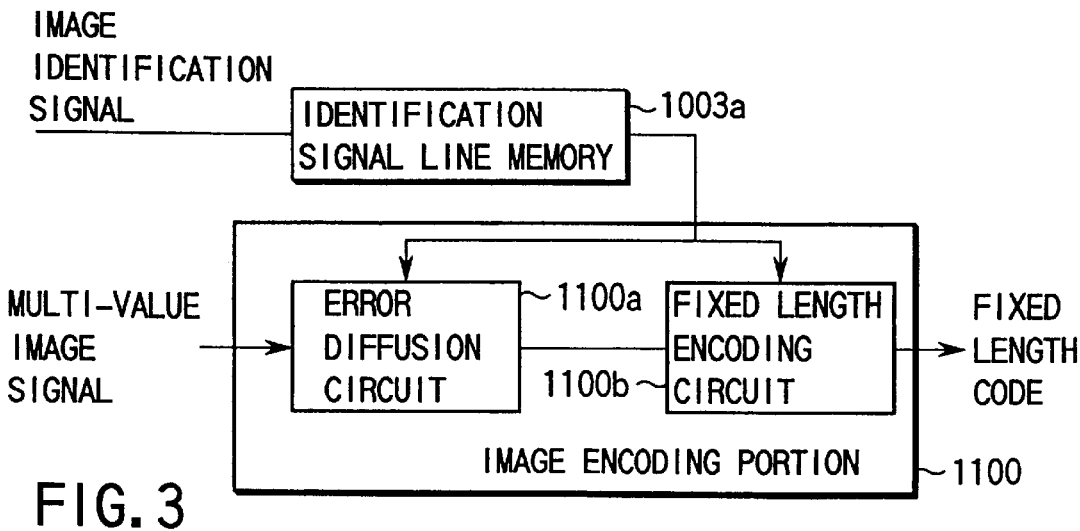
FIG. 3 is a diagram illustrating an example of the configuration of an image encoding portion.

The image encoding portion 1100 will now be described in detail. As shown in FIG. 3, the image encoding portion 1100 comprises an error diffusion process circuit 1100a and a fixed length encoding circuit 1100b. The error diffusion process circuit 1100a receives the input of multi-value image data from the line memory 1002 and reads the result of identification in blocks of 2×2 pixels (image identification signal) from the identification signal line memory 1003a to perform an error diffusion process thereon in the error diffusion process circuit 1100a. The result of the process is converted by the fixed length encoding circuit 1100b into codes having a fixed length which are in turn output to the memory 1004.

Figure 4:
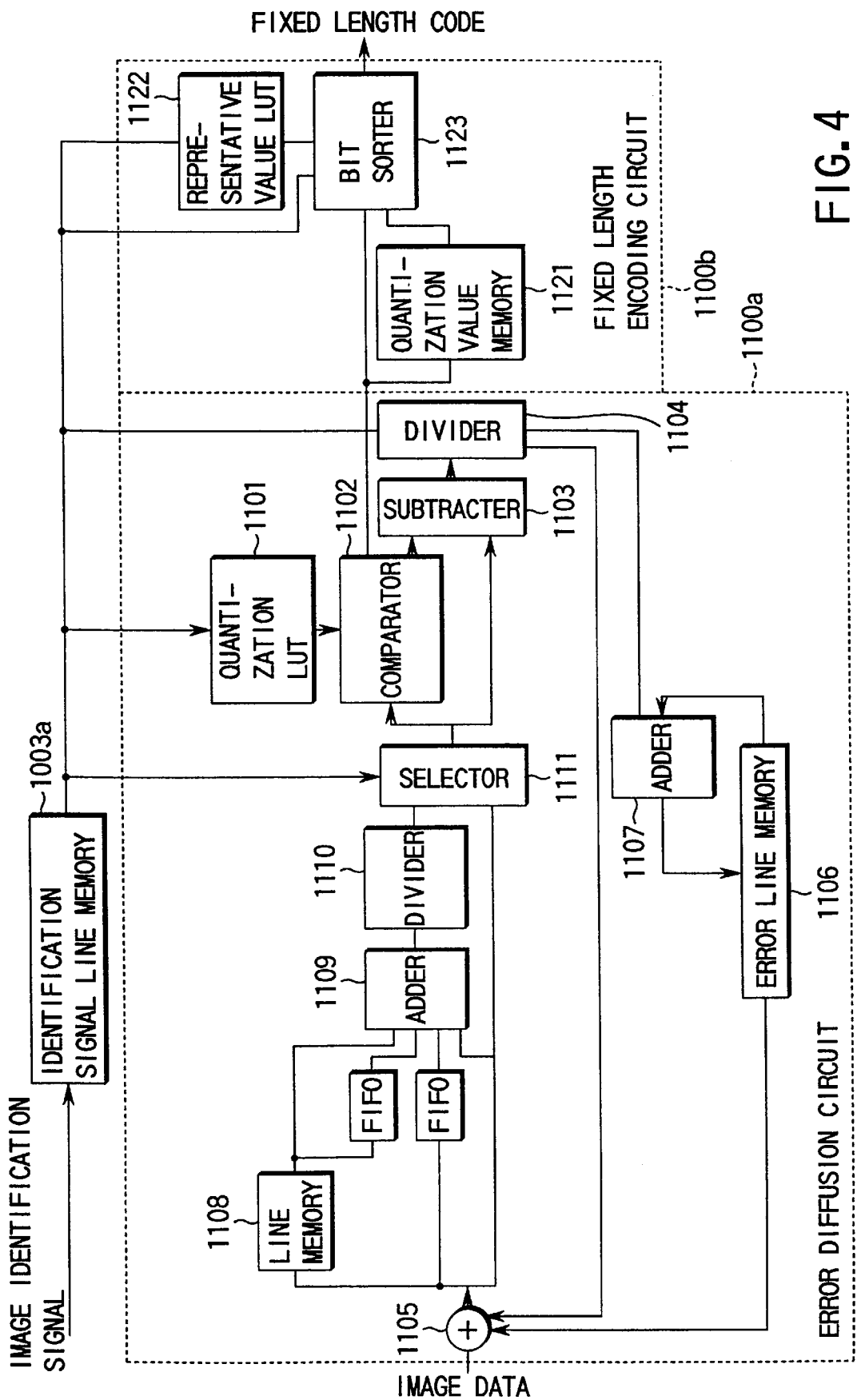
FIG. 4 is a diagram illustrating examples of configurations of an error diffusion circuit and a fixed length encoding circuit.

FIG. 4 shows configurations of the error diffusion process circuit 1100a and the fixed length encoding circuit 1100b.

Figure 5A:
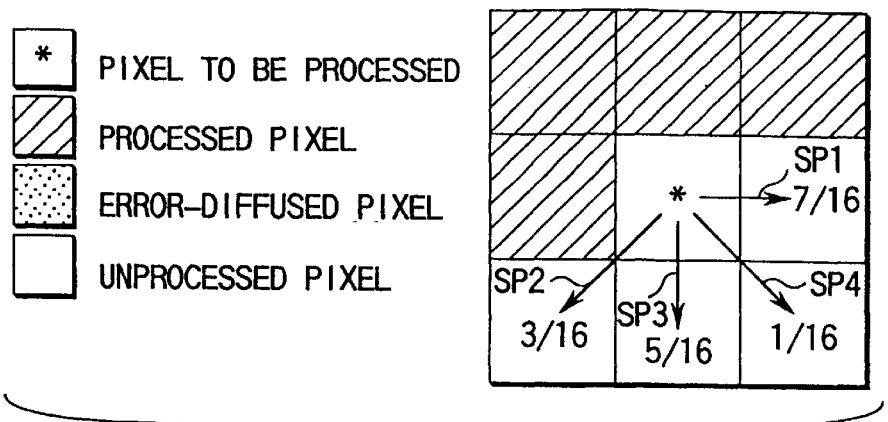
FIGS. 5A and 5B are diagrams schematically illustrating an error diffusion process.
Figure 5B:
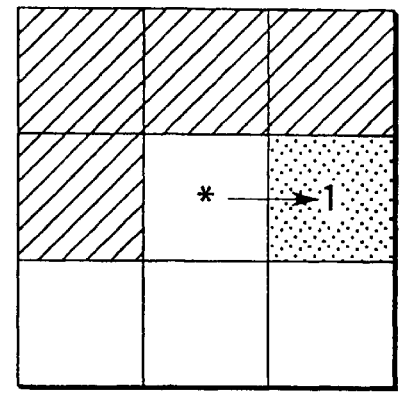
Figure 6:
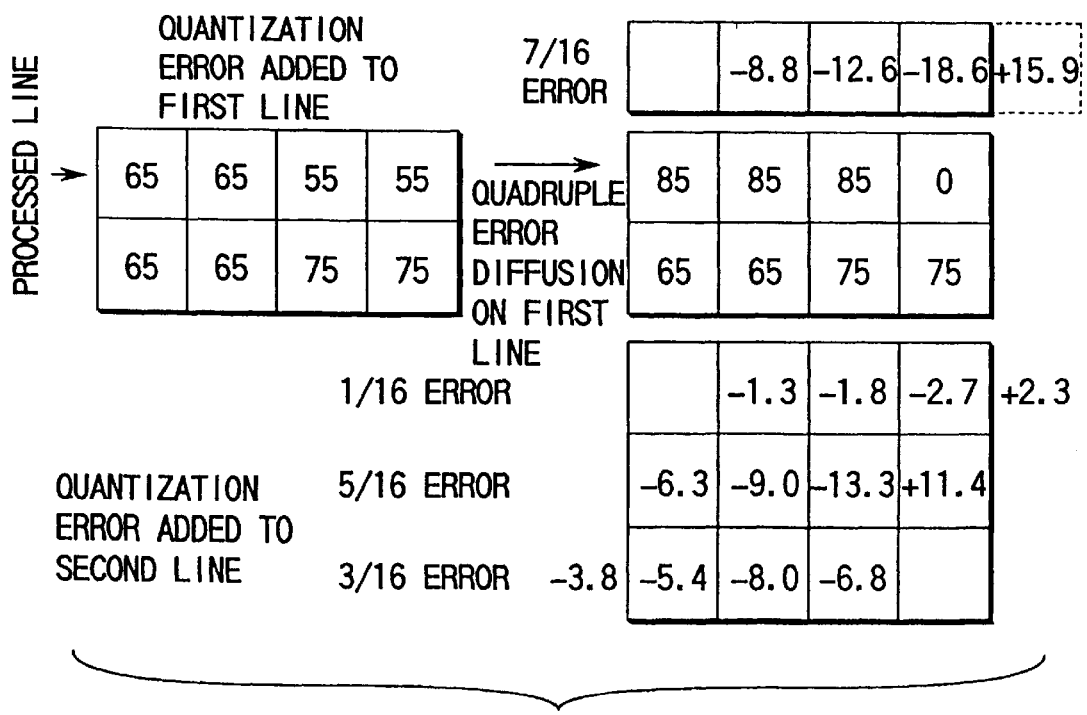
FIG. 6 is a diagram illustrating a result of a 4-value error diffusion process on image data having values represented by 256 values and illustrating how quantization errors occur.

First, the error diffusion process circuit 1100a will be described. FIGS. 5A and 5B schematically illustrate the error diffusion process. The error diffusion process is a method of propagating a quantization error of a pixel to be processed to neighboring pixels with some weight applied thereto to represent the number of tones which gives visual appearance equivalent to the original image using several pixels surrounding the pixel to be processed. Method for propagating an error includes a method wherein an error is propagated to the neighboring pixels to be processed next and neighboring pixels on the next line to be processed (refer to FIG. 5A) and a method wherein an error is propagated to the neighboring pixels to be processed next (refer to FIG. 5B). To perform error propagation as shown in FIG. 5A in a copier or the like which processes line by line, a buffer is provided for each line to store a quantization error to be added to the next line until the process proceeds to the next line. The figures shown on the arrows in FIGS. 5A and 5B represent weighting coefficients which indicate the degree of distribution of a quantization error to each pixel. FIG. 6 shows a result of a 4-value error diffusion process on data having values represented by 256 steps using the weighting coefficients shown in FIG. 5A and how quantization errors occur. The error enclosed in the dotted line in FIG. 5A is cut off or added to a neighboring pixel because there is no pixel to which it is to be propagated.

A description will now be made on an operation of the error diffusion process circuit 1100a in FIG. 4 corresponding to the operation in FIG. 6. The value of a pixel to be processed is compared with data in a quantization look-up table (LUT) 1101 by a comparator 1102 to determine a quantization value which is sent to the fixed length encoding circuit 1100b. A subtracter 1103 calculates a quantization error between the quantization value and the value of the pixel to be processed, and a divider 1104 calculates distribution to the neighboring pixels shown in FIG. 5A. An error obtained by multiplication by a factor of 7/16 is propagated to the next pixels to be processed and is directly added to pixel values (pixel data) read by an adder 1105 from the line memory 1002. Meanwhile, errors obtained by multiplication by factors of 3/16, 5/16 and 1/16 are added by an adder 1107 to error values of previously processed pixels in coordinates to be stored as shown in FIG. 5B read from an error line memory 1106, the result being added to the error line memory 1106. Errors on the line processed currently are read from the error line memory 1106 during the processing on the pixels on the next line, added to the values of the pixels to be processed read from the line memory 1002 and subjected to the same process as described above.

Figure 7:
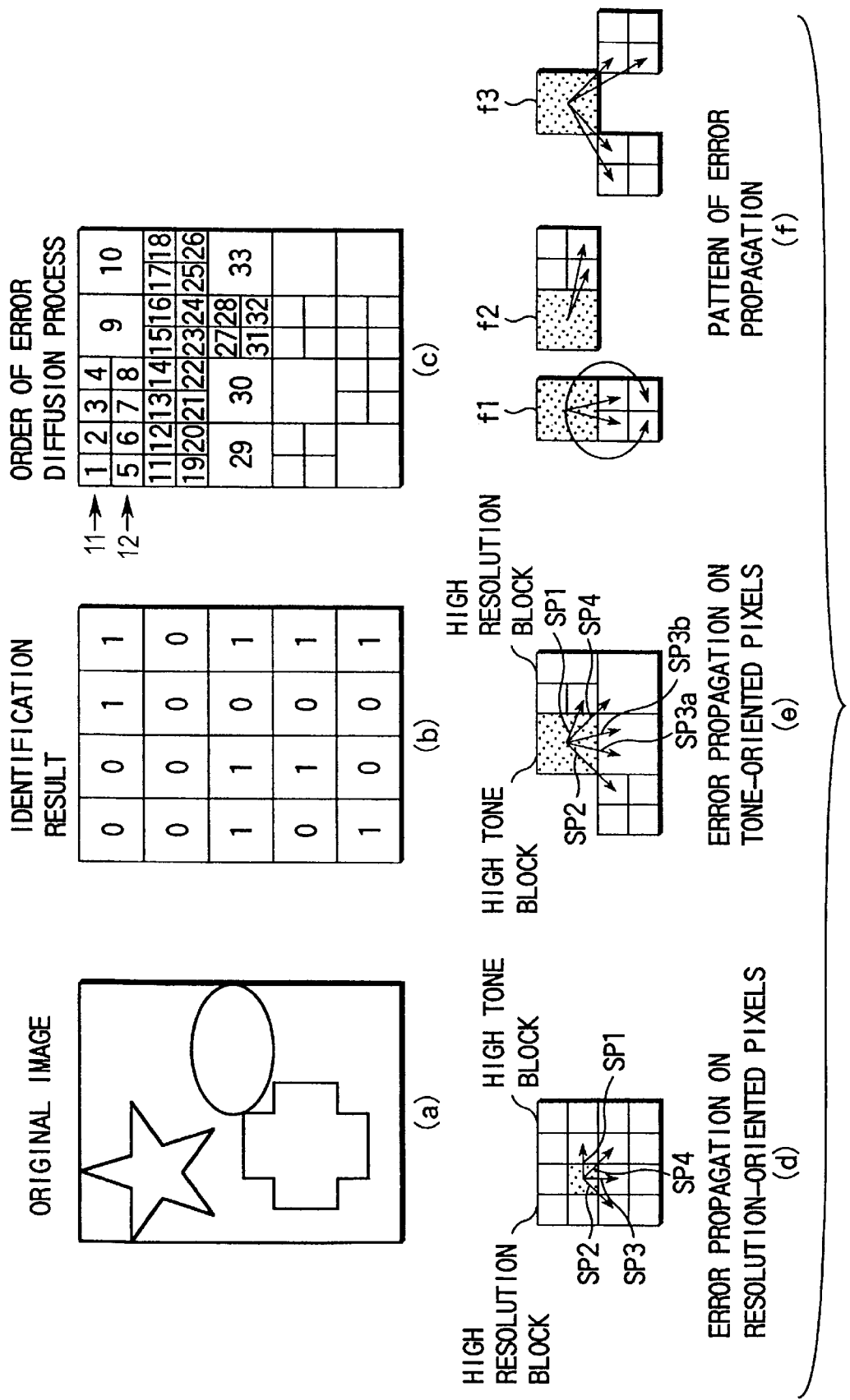
FIG. 7 is a diagram illustrating the error diffusion process in more detail.

The images shown in (a) on FIG. 7 are input to the image identification portion 1003 to be identified as shown in (b) on FIG. 7. "0" is output for a block in which priority is given to resolution, and "1" is output for a block in which priority is given to tone characteristics. Then, the encoding process in the image encoding portion 1100 first performs an error diffusion process in the order indicated by the figures shown in FIG. 7. The error diffusion process proceeds basically line by line, e.g., it proceeds on the pixels on the line 11 and then on the pixels on the line 12. For tone-oriented blocks, the error diffusion process is performed by errors are diffused on the line 12 which is the lowermost line to which those blocks belong.

A description will now be made on an operation of the error diffusion process circuit 1100a in FIG. 4 corresponding to the operation shown in (a) through (f) on FIG. 7. Since a block spans two lines, the result of identification of each block is stored in the identification result line memory 1003a, and the line 11 is first processed with reference to the result of identification. For the pixels "1", "2", "3" and "4" in (c) on FIG. 7, a selector 1111 regards them as resolution-oriented pixels and selects pixel values to which errors have been directly added. The comparator 1102, subtracter 1103 and divider 1104 sequentially perform the error diffusion process. In response to identification signals, the quantization LUT 1101 is reference with priority given to resolution. The resultant quantization values are stored in a quantization value memory 1121. The pixels in the regions corresponding to the pixels "9" and "10" on the line 11 in (c) on FIG. 7 are stored in a line memory 1108 but are not subjected to subsequent processes. Then, the results of identification of blocks associated with the pixels "5", "6", "7" and "8" on the line 12 are similarly read and are processed by sequentially adding error values from the previous pixels and from the results of the process on the line 11. For the pixels "9" and "10", the pixels values on the line 11 in the block of interest are read from the line memory 1108 and are added to the pixels to be processed on the line 12 at an adder 1109 and are averaged by a divider 1110, the result being passed by the selector 1111 to a subsequent process for similar processing. At this time, the quantization LUT 1101 is reference with priority given to tone characteristics.

As apparent from (d) on FIG. 7, when the method of propagation shown in FIG. 5A is used, the rules for error distribution are the same as those shown in FIG. 5A for propagation from a resolution-oriented pixel to a resolution-oriented pixel and from a resolution-oriented pixel to a tone-oriented pixel.

As shown in (e) on FIG. 7, the propagation from a tone-oriented pixel to a tone-oriented pixel and from a tone-oriented pixel to a resolution-oriented pixel is carried out with resolutions selected with priority to tone characteristics. An error to be propagated is obtained by quantizing the average value of the pixels including the values in the high tone block and, therefore, a value obtained by multiplying the resultant error value by the number of the pixels in the blocks, that is, four in the present embodiment, is propagated. The error diffusion process circuit 1100a shown in FIG. 4 calculates error distribution values for tone-oriented blocks by multiplying the error by factors of 7/4, 3/4, 5/4, 1/4 and 4. Since the calculation of error propagation must be processed pixel by pixel as for resolution-oriented blocks, a propagated error SP3 is propagated pixel by pixel after dividing it into propagated errors SP3a and SP3b. Specifically, the error diffusion process circuit 1100a in FIG. 4 calculates using a propagated error of 5/8 instead of 5/4. Further, a propagated error SP1 is propagated only to pixels associated with the line 12 because the process of the tone-oriented blocks is carried out in the position of the line 12 in (c) on FIG. 7. Propagated errors SP2 and SP4 are also propagated to the minimum unit of pixels in a block to which they are to be propagated. While error propagation according to this method is carried out line by line for tone-oriented blocks, this method provides a cost reduction because it requires less buffer for storing errors than performing propagation along the sub scan lines as indicated by the propagation patterns f1 and f3 in (f) on FIG. 7. While propagation in the main scanning direction is performed pixel by pixel except straight downward propagation according to this method, this method suppresses blurring in an image because it localizes variations of values attributable to error diffusion compared to a method of performing split propagation in the main scanning direction as indicated by the propagation patterns f2 and f3 in (f) on FIG. 7.

Figure 8A:
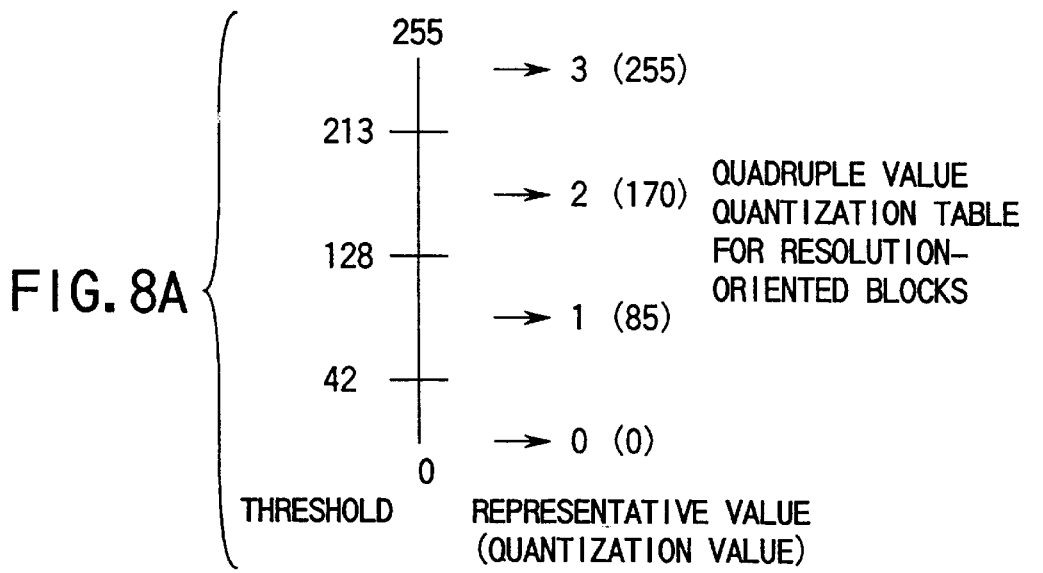
FIGS. 8A, 8B and 8C are diagrams illustrating quantization processes on resolution-oriented blocks and tone-oriented blocks.
Figure 8B:
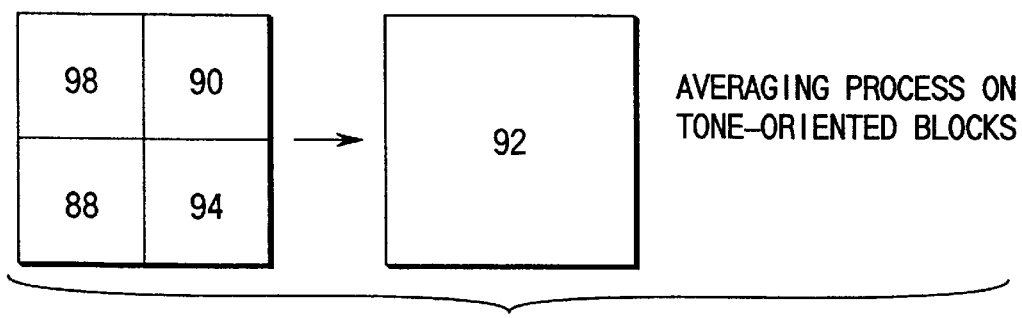
Figure 8C:
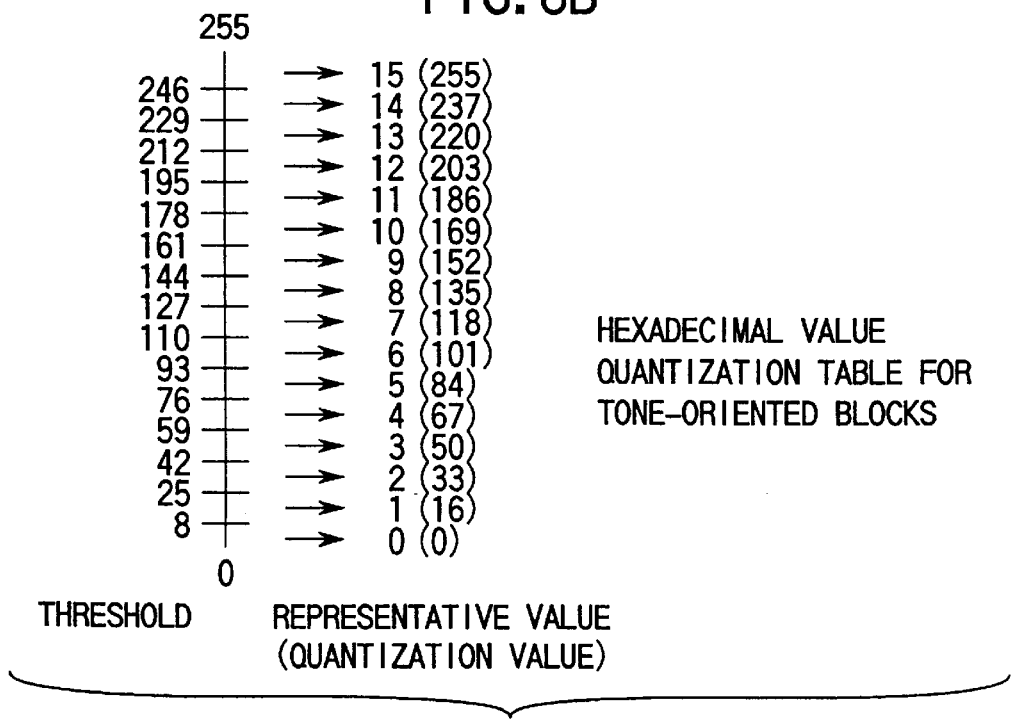
Figure 9A:
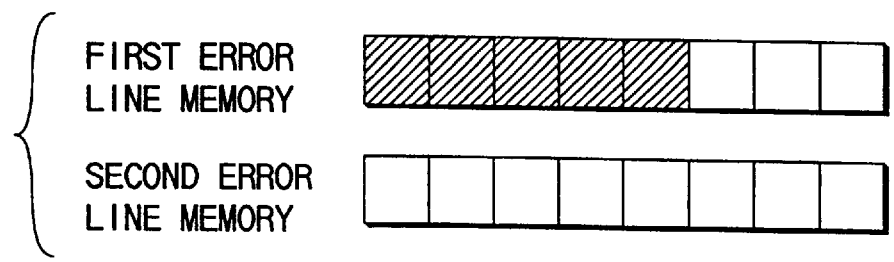
FIGS. 9A, 9B, 9C and 9D are diagrams illustrating an error diffusion process.
Figure 9B:
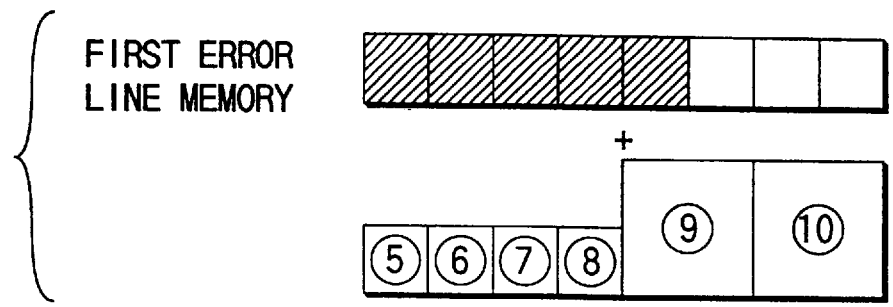
Figure 9C:
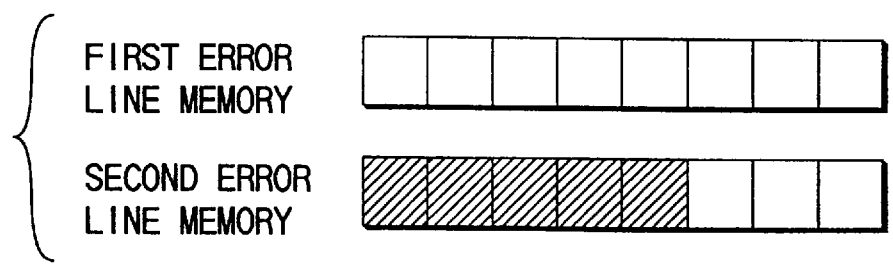
Figure 9D:
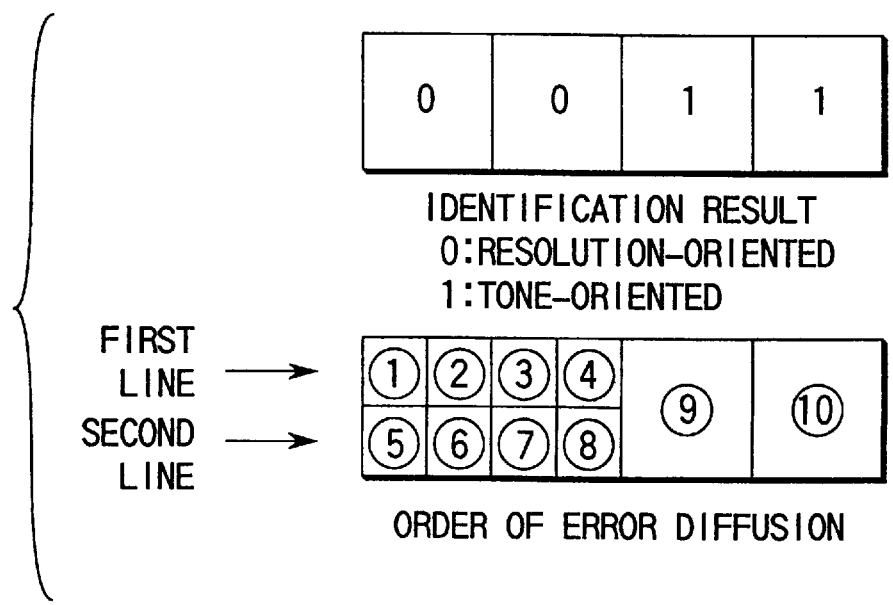

The processing of resolution-oriented and tone-oriented blocks will now be described as a process on one 2×2 block of 600 dpi/256 values. Then, as shown in FIGS. 8A, 8B and 8C, a resolution-oriented block is quantized pixel by pixel into four values using the thresholds shown in FIG. 8A to encode it at 600 dpi/4 values, thereby propagating quantization errors. In order to encode a tone-oriented block at 300 dpi/hexadecimal, as shown in FIG. 8B, the four pixels are averaged to reduce the resolution thereof. Then, a quantization process is performed using the thresholds shown in FIG. 8C to propagate quantization errors. The quantization LUT 1101 stores thresholds and quantization values as shown in FIGS. 8A and 8C for resolution-oriented and tone-oriented blocks.-IN The error line memory 1106 in FIG. 4 has a common buffer for resolution-oriented pixels and tone-oriented pixels as shown in FIGS. 9A, 9B and 9C and uses it as a double buffer for storing errors and for addition. For example, it performs an error diffusion process on a block to be processed identified as shown in FIG. 9D in the order shown also in FIG. 9D using the procedure shown in FIGS. 9A, 9B and 9C.

The process of error diffusion on a pixel includes two different error diffusion processes (a resolution-oriented error diffusion process and a tone-oriented error diffusion process) performed in parallel, and output results may be switched by the selector according to the result of identification at the image identification portion.

The fixed length encoding circuit 1100b will now be described. In the fixed length encoding circuit 1100b, quantization values are converted by representative value LUT 1122 into representative values as shown in FIGS. 8A, 8B and 8C, and a bit sorter 1123 performs encoding as shown in FIGS. 10A and 10B. Specifically, as shown in FIG. 10A, to encode each of four quantization values (0, 85, 170, 255) for four respective pixels of one 2×2 resolution-oriented block into two bits, 2 bits×4 pixels=8 bits and 1 bit ("0") for the identification of the resolution-oriented block are added to the block. As a result, the code for one resolution-oriented block has 9 bits in total. As shown in FIG. 10B, a hexadecimal value (0, 16, 33, . . . , 255) quantized from four pixels of one 2×2 tone-oriented block is encoded into 4 bits to which 1 bit is added for the identification of the tone-oriented block. Thus, the code for the tone-oriented block has 5 bits in total. As shown in FIG. 11, a tone-oriented block has four dummy bits in addition to the 4-bit code. Therefore, one 2×2 block is encoded into a 9-bit code whether it is resolution-oriented or tone-oriented.

While FIG. 4 shows a configuration in which only quantization values are output by the quantization LUT 1101 and the comparator 1102 and are converted into representative values by the representative value LUT 1122, the quantization LUT 1101 may store the representative values to allow a configuration from which the representative value LUT 1122 is deleted to decrease the size of the quantization value memory 1121.

In summary, the configuration shown in FIG. 4 makes it possible to perform 9/32 compression of four pixels, that is, one block from 32 bits to 9 bits.

When the multiple value (quadruple value) of a resolution-oriented block is a binary value, the code tables shown in FIGS. 12A and 12B are obtained. As a result, the code for a resolution-oriented block has 5 bits in total; the code for a tone-oriented block has 5 bits in total because it needs no dummy code; and the compression ratio can be significantly improved from 9/32 to 5/32 as shown in FIG. 13 without any significant deterioration of image quality.

Figure 16:
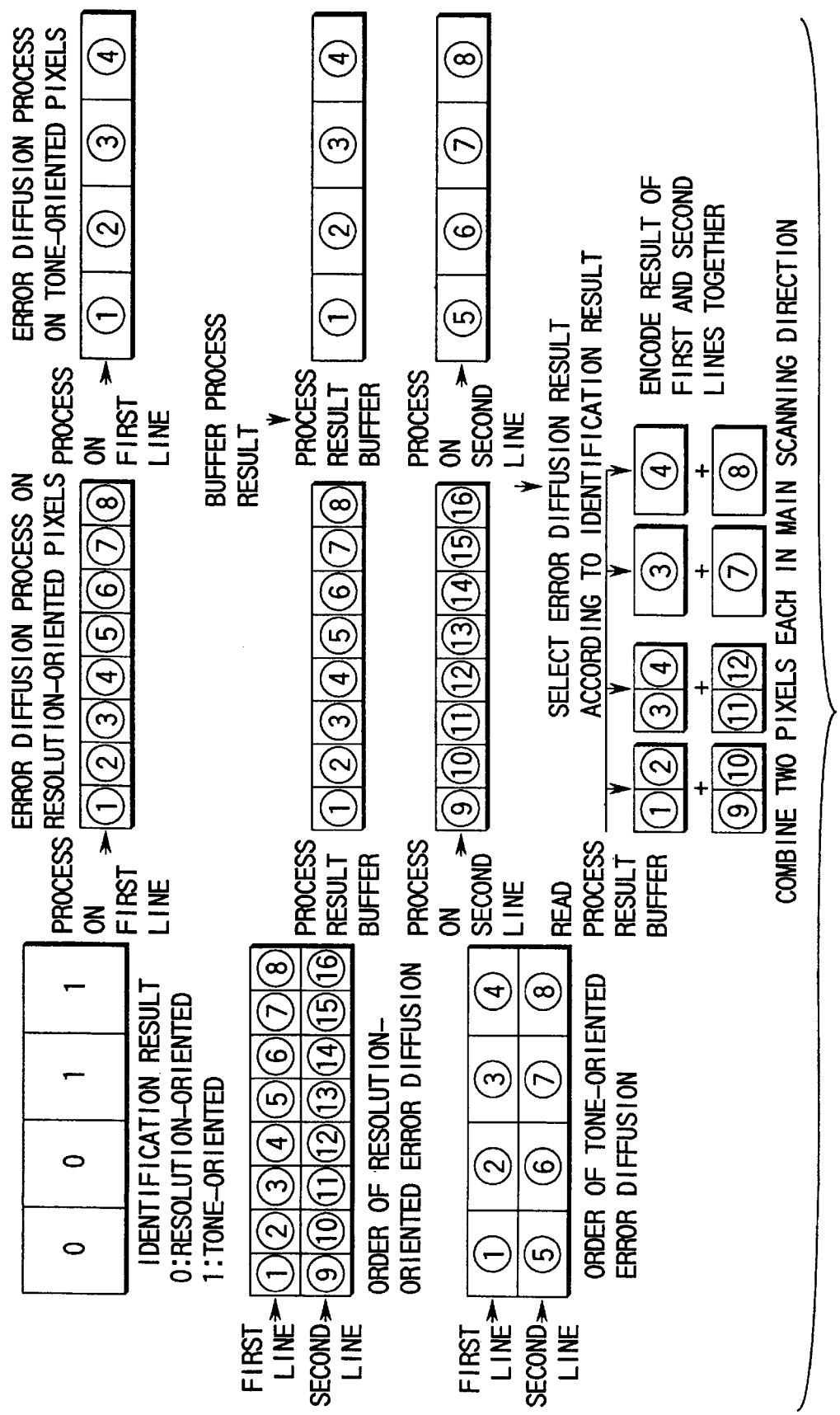
FIG. 16 is a diagram illustrating an error diffusion process for averaging every two tone-oriented in a main scanning direction as shown in FIG. 14B.
Figure 17:
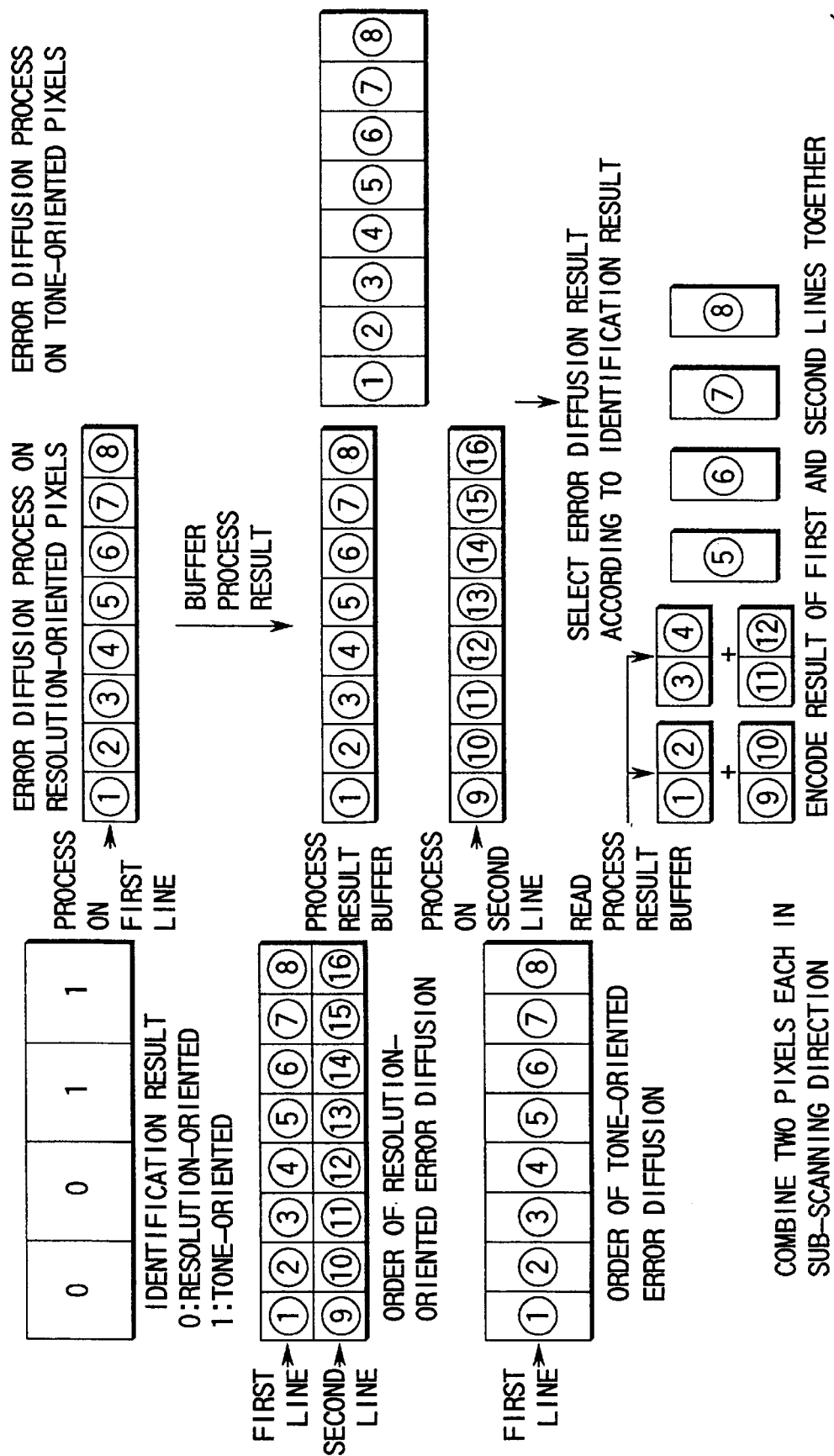
FIG. 17 is a diagram illustrating an error diffusion process for averaging every two tone-oriented in a sub-scanning direction as shown in FIG. 14B.

As shown in FIG. 14B, by averaging two pixels instead of four pixels for a tone-oriented block, image quality can be improved with the compression ratio of 9/32 maintained as shown in FIG. 15. As shown in FIG. 14B, when a tone-oriented block is averaged for every two pixels in the main scanning direction and sub-scanning direction, error diffusion occurs in the orders shown in FIGS. 16 and 17, respectively. Further, when four pixels are averaged, the average value represented in 256 steps may be stored as it is instead of performing error diffusion to encode it with a significant stress on tone characteristics. FIGS. 16 and 17 illustrate the orders in which error diffusion occurs in the configuration. Further, when two pixels are combined only in the main scanning direction as shown in FIG. 16, the line memory 1108 is not necessary because the error diffusion process is completed by per line.

Figure 18:
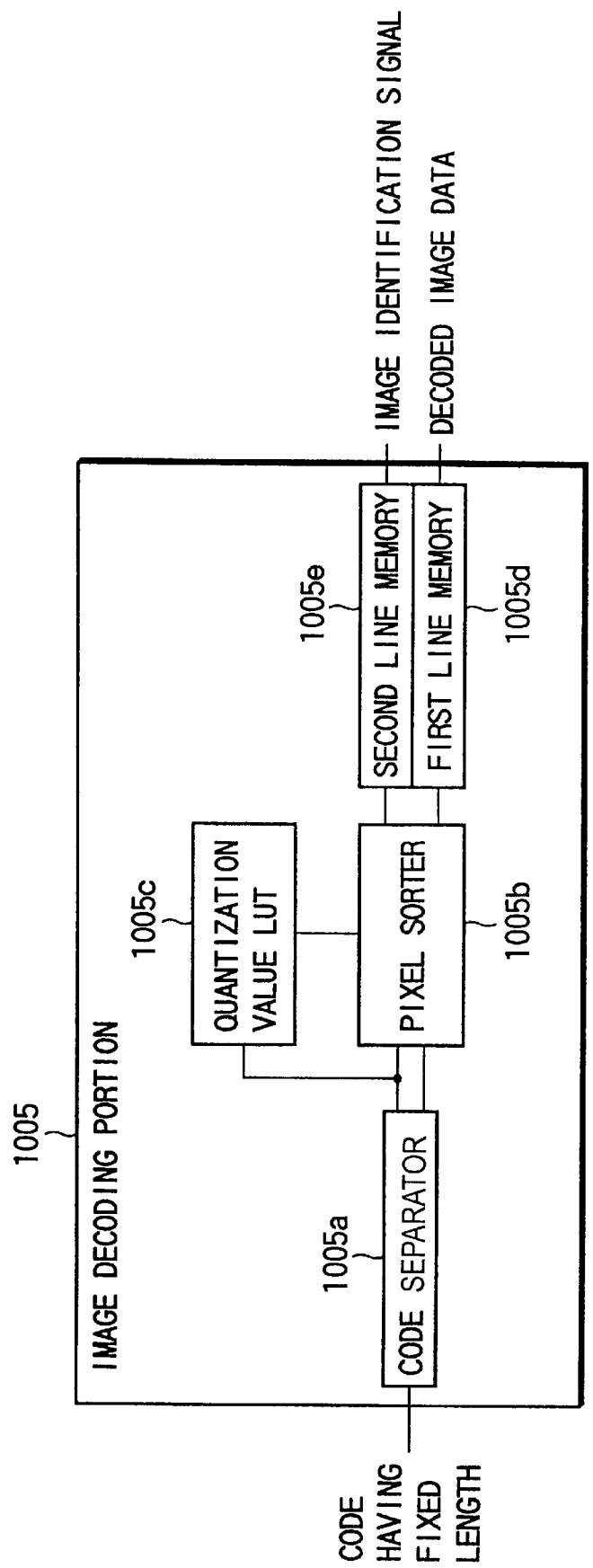
FIG. 18 is a diagram illustrating an example of the configuration of an image decoding portion.

The image decoding portion 1005 shown in FIG. 1 will now be described with reference to FIGS. 18 and 19. FIG.

Figure 19:
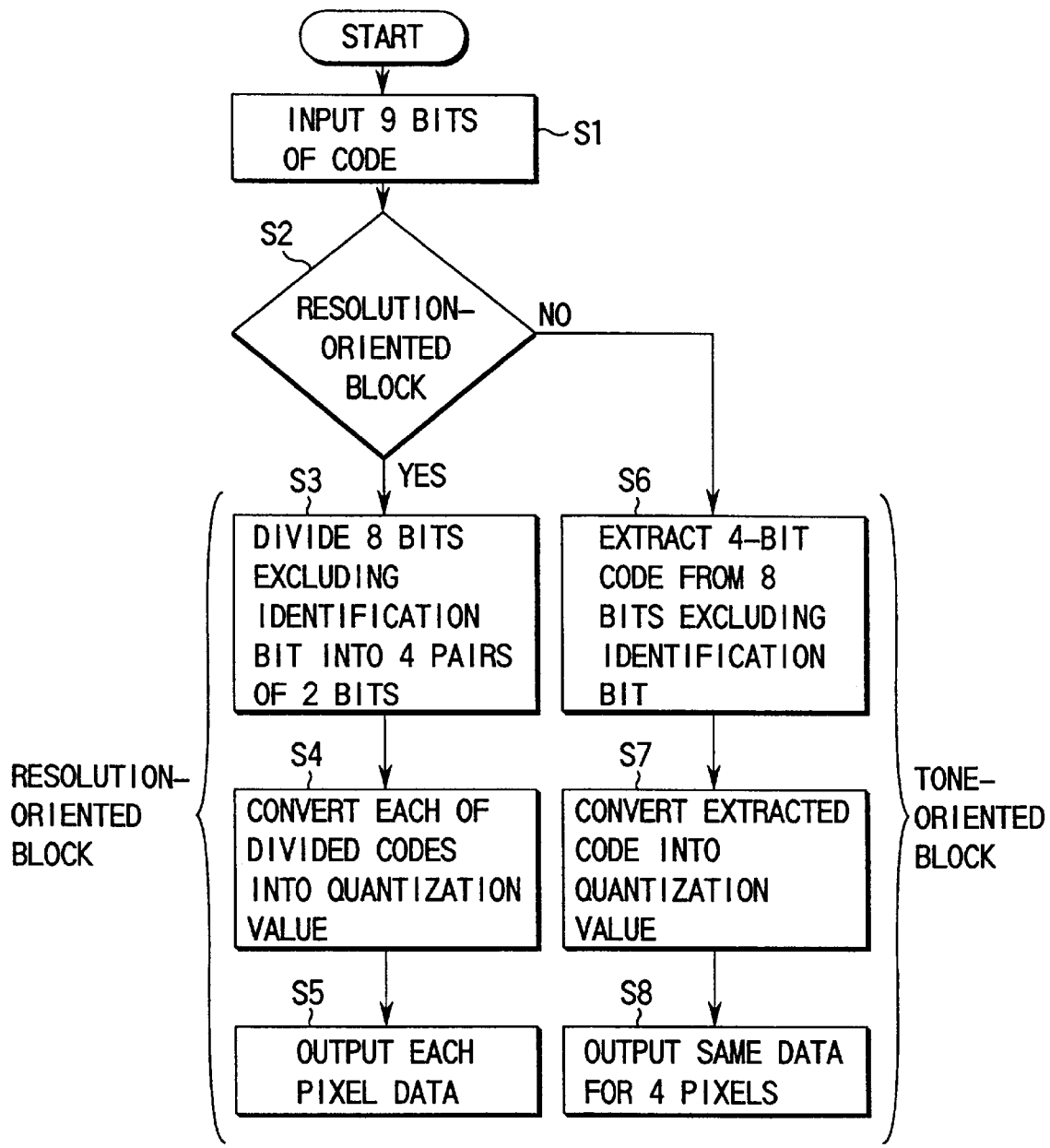
FIG. 19 is a flow chart illustrating an operation of the image decoding portion in FIG. 18.
Figure 23:
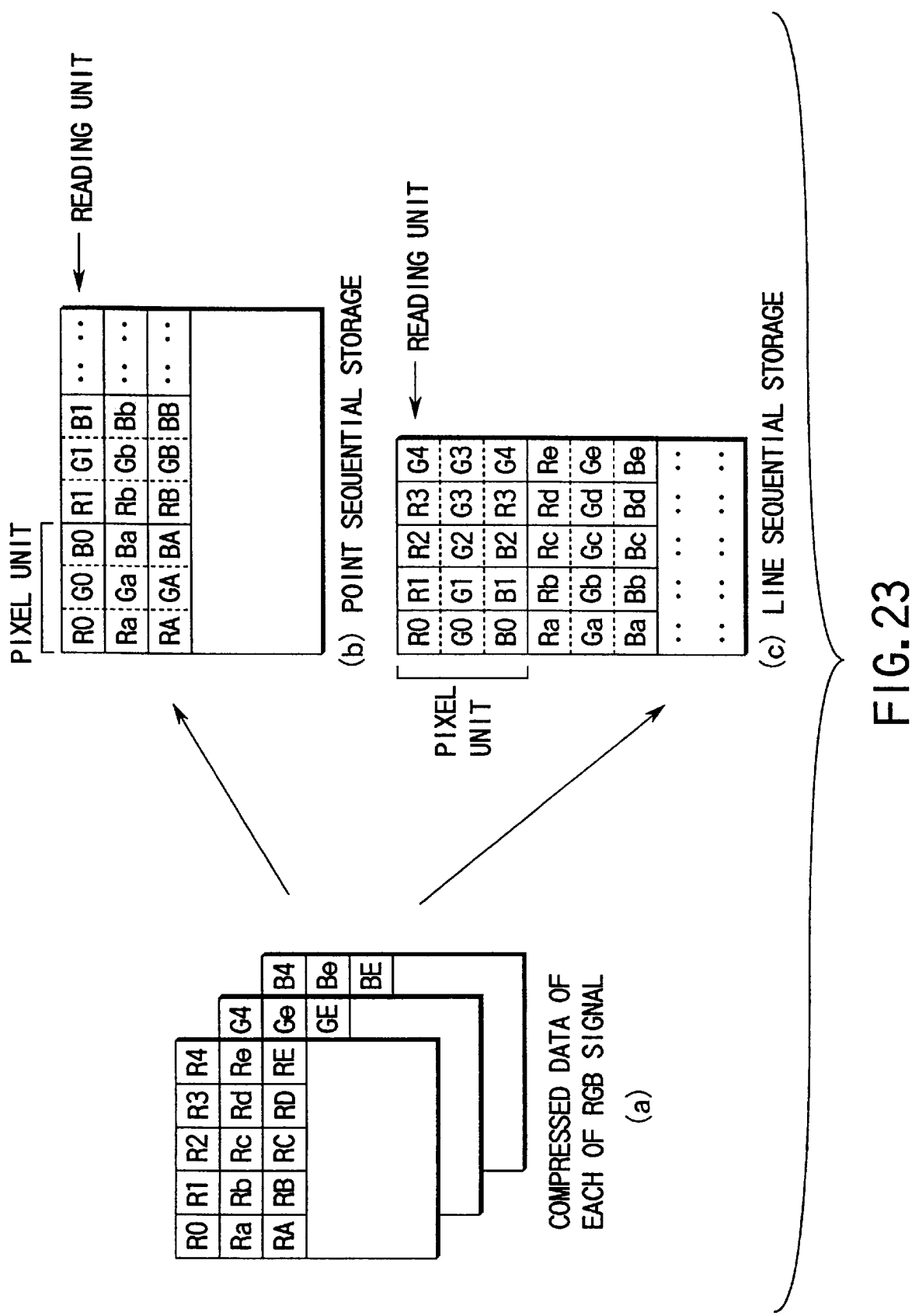
FIG. 23 is a diagram illustrating a method of storing compressed data of RGB signal which have been encoded on a fixed length basis in a memory.

18 shows an example of the configuration of the image decoding portion 1005, and FIG. 19 is a flow chart showing its operation of the same. First, compressed data (a fixed length code) a bits for one block is input (step S1 in FIG. 19) to a code separator 1005a which separates the data into an identification bit and a pixel value code portion (step S2). A pixel sorter 1005b determines whether the block is resolution-oriented or tone-oriented from the identification bit to acquire representative values. When the identification bit is "0", it decodes the pixel values into 8-bit quantization values as shown in FIG. 8A with reference to a table for tone-oriented blocks as shown in FIG. 8A stored in a quantization look-up table (LUT) 1005c in advance (steps S3 and S4). When the identification bit is "1", it decodes the pixel values into 8-bit quantization values as shown in FIG. 8C with reference to a table for resolution-oriented blocks as shown in FIG. 8C stored in the quantization look-up table (LUT) 1005c in advance (steps S6 and S7).

The pixel sorter 1005b outputs pixel data as the result of decoding of each of the resolution-oriented and tone-oriented blocks to a first line memory 1005d. It also outputs the image identification signals (identification bits) to a second line memory 1005e (steps S5 and S8). While the pixel sorter 1005b performs decoding only once and outputs the same data four times for a tone-oriented block, it may decode the same data four times instead.

The image decoding portion 1005 operates in the same manner whether the image encoding portion 1100 has the configuration shown in FIG. 3.

The printer 1006 typically outputs line by line. Therefore, in the case of a 2×2 block, the block is configured in the first line memory 1005d as a 2-line memory configuration (FIFO memories A and B) as shown in FIG. 20 and is sequentially read and output from the memories.

The identification signals are also held in the second line memory 1005e line by line. As a result, when the printer 1006 can select the method of output depending on whether priority is given to resolution or tone characteristics, it outputs characters or the like with a high density and outputs continuous tones as in photographs or the like in a manner which stresses continuity between color tones even for black in the same density "255". This sharpens edges and the like of characters for improved visual perception and provides photographs and the like with smooth reproduction of gradation for improved output image quality.

Referring to a rotating process, since information for each pixel is encoded bit by bit as shown in FIGS. 10A through 24, either the image encoding portion 1100 or image decoding portion 1005 can perform rotation within a block by changing the positions in the codes where the pixel information is written or read. Further, in the case of rotation of each block, the rotation process can be achieved with the fixed length codes maintained because rotation can be carried out on a block basis by changing the method for accessing the memory 1004.

While the number of bits per block is 9 in the present embodiment, the configurations as shown in FIGS. 21A, 21B and 21C wherein seven or eight blocks are transferred at once to the memory 1004 shown in FIG. 1 allows the data to be accessed on a byte basis. FIG. 21A shows a case wherein seven blocks are consolidated and one dummy bit is used to allow access on a byte basis. FIGS. 21B and 21C show a case wherein the identification bit and the pixel value code portion are separated to allow access each eight or nine bytes, thereby allowing the internal information to be basically treated on a byte basis. The configurations of the accessing units shown in FIGS. 21A and 21B result in a slight reduction in the compression ratio from 63/224 to 64/224.

As described above, the first embodiment makes it possible to achieve a compression ratio of 9/32 or even a ratio of 5/32 which are higher than the compression ratio of 12/32 achievable with the method per Article 1 described in the section of the background of the invention using a simpler encoding and decoding process than the conventional compression methods on a fixed length basis. Further, since the mode of error diffusion is switched depending on the nature of an image, a reduction of the compression ratio down to 5/32 which is on the same level as the conventional binary error diffusion does not make texture or the like in a tone image noticeable, thereby allowing high output image quality. Further, since encoding is carried out with the nature of local image, the result of output which is high image quality can be obtained by selecting a method of output depending on nature of image by output apparatus such as printer.

A Second Embodiment

A description will now be made on a digital color copier which is an image forming apparatus employing an image encoding/decoding apparatus of the present invention as a modification of the first embodiment. FIG. 22 is a block diagram schematically illustrating an example of the configuration of major parts of the digital color copier. As shown in FIG. 22, the digital color copier comprises a color scanner 2001 for reading an original image as color image data, a line memory 2002, an image identification portion 2003, an image encoding portion 2100, a memory 2004, an image decoding portion 2005, a color conversion portion 2007 and a color printer 2006.

It basically operates in the same manner as the first embodiment except that it has signals in three systems instead of one system. The image identification portion 2003 and the image encoding portion 2100 perform the same processes as those in the above-described image identification portion 1003 and the image encoding portion 1100, respectively, for three color signals R, G and B in parallel.

As shown in FIG. 23A, compressed data of each of the RGB color signal obtained by the image encoding portion 2100 is stored in the memory 2004 on an RGB dot sequential basis as shown in FIG. 23B or on an RGB line sequential basis as shown in FIG. 23C.

The image decoding portion 2005 performs the same process as in the first embodiment on each of the color signals.

The color conversion portion 2007 receives the input of the RGB color signal and converts them into CMY color signal which are in turn passed to the color printer 2006. In this process, a conversion table.

The second embodiment makes it possible to improve compression performance from a compression ratio of 36/96 according to Article 1 described in the section of the background of the invention to a compression ratio of 27/96.

A Third Embodiment

Figure 24:
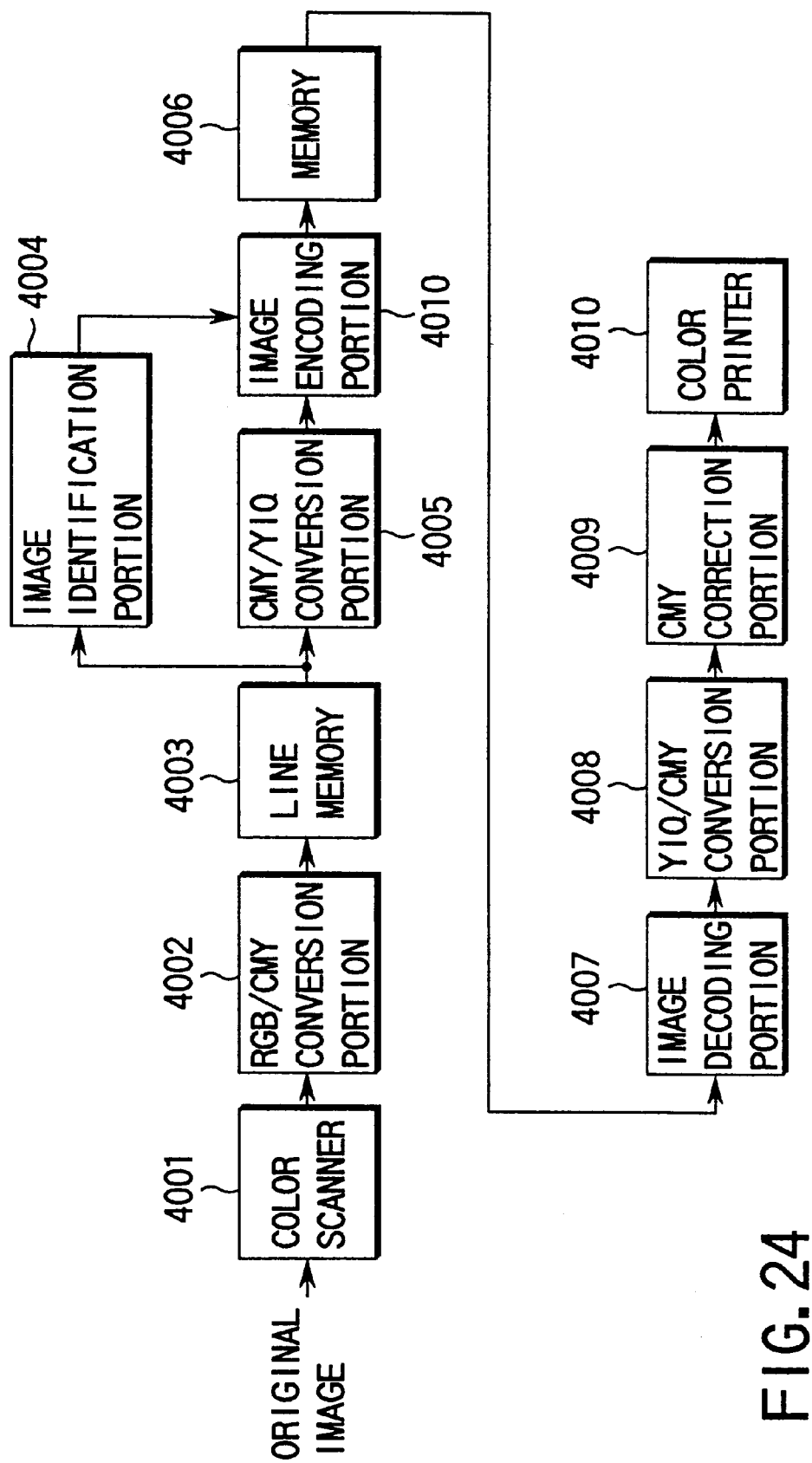
FIG. 24 is a diagram illustrating an example of the configuration of major parts of a digital color copier according to a third embodiment of the present invention.

FIG. 24 is a block diagram schematically illustrating an example of the configuration of major parts of a digital color copier which is an image forming apparatus employing an image encoding/decoding apparatus according to the present invention. As shown in FIG. 24, this digital color copier comprises a color scanner 4001, an RGB/CMY conversion portion 4002, a line memory 4003, an image identification portion 4004, a CMY/YIQ conversion portion 4005, an image encoding portion 4100, a memory 4006, an image decoding portion 4007, a YIQ/CMY conversion portion 4008, a CMY correction portion 4009 and a color printer 4010.

Each processing block of this digital color copier will now be described. The color scanner 4001 irradiates a draft with light and reads the reflected light with a CCD having R, G and B filters to read the draft as multi-value color image data. The RGB/CMY conversion portion 4002 converts a signal input as reflected light into an amount of ink output by the color printer 4010. In general, the color space of the draft acquired by the reading with the scanner 4001 and the color space represented by the amount of ink reproduce different color ranges, the latter color space being smaller in the color reproduction range. Therefore, the RGB/CMY conversion portion 4002 performs compression or the like on an input color reproduction range to convert it into signals which can be represented by ink amounts C, M and Y. This technique is referred to as "color correction" and is non-linear conversion. The ranges of values to be converted are $0 \leq C, M, Y \leq 255$.

The line memory 4003 treats 2 lines of data as one unit for a block of 2×2 when the data is generated in a scanner line by line as in the first embodiment.

The image identification portion 4004 identifies each block of an input image as a resolution-oriented image or tone-oriented image and output the result of identification for each block.

The CMY/YIQ conversion portion 4005 converts color signals C, M and Y into a luminance signal Y and two color-difference signals I and Q using the following equations disclosed in Article 1 cited in the section of the background of the invention.

$Y=0.3R+0.59G+0.11B$   Equation 1

$I=-0.27(B-Y)+0.74(R-Y)$   Equation 2

$Q=0.41(B-Y)+0.48(R-Y)$   Equation 3

The reverse conversion employs equations for reverse conversion from YIQ mentioned also in Article 1 described in the section of the background of the invention (Equations 4 through 6).

$R=Y+0.59I+0.62Q$   Equation 4

$G=Y-0.27I-0.64Q$   Equation 5

$B=Y-1.11I+1.72Q$   Equation 6

The CMY/YIQ conversion portion 4008 uses Equations 1 through 6 with R, G and B substituted for C, M and Y.

Since the human visual system is less capable of resolving changes in colors such as changes in color difference than resolving changes in brightens, e.g., luminance, a reduction of the resolution of a color difference signal will give less impact on image quality than a luminance signal and therefore the amount of information can be reduced. It is therefore possible to perform efficient compression when the image encoding portion 4100 encodes a luminance signal Y and color difference signals I and Q converted from CMY signal by the CMY/YIQ conversion portion 4005.

The image encoding portion 4100 will now be described. A basic process at this portion is to perform an error diffusion process on each block to encode data block by block as in the first embodiment.

Figure 25:
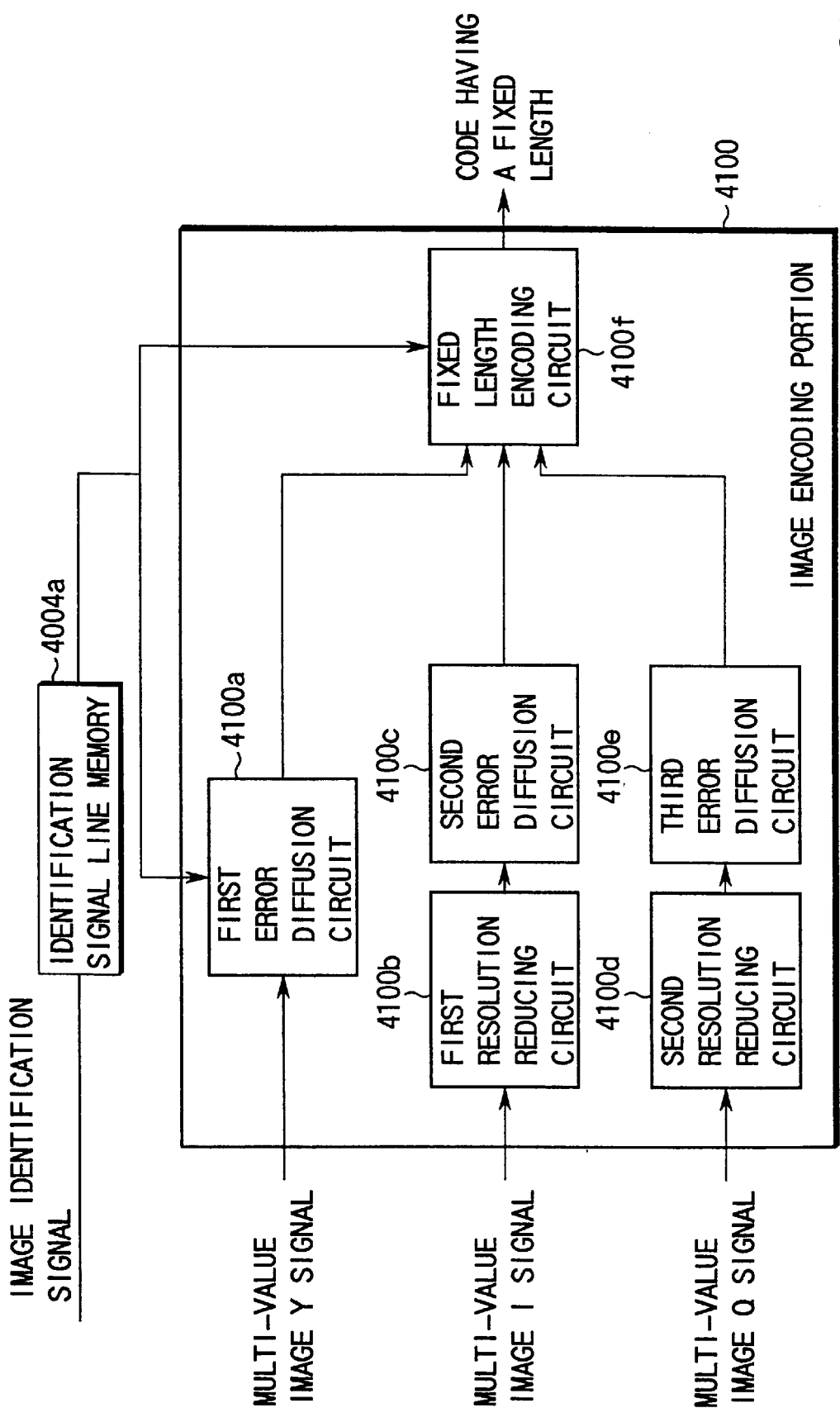
FIG. 25 is a diagram illustrating an example of the configuration of the image encoding portion.

FIG. 25 shows an example of the configuration of the image encoding portion 4100. While the same process is carried out on all of the RGB signal according to the second embodiment, the error diffusion and encoding are performed in different manners on the Y signal and IQ signal in the present embodiment. The Y signal is subjected to an error diffusion process at a first error diffusion circuit 4100a. The process is switched in accordance with image identification signals output by an identification signal line memory 4004a as the result of identification at the image identification portion 4004. The IQ signal are subjected to resolution conversion at a first and second resolution reducing circuits 4100b and 4100d and are then subjected to an error diffusion process at a second and third error diffusion circuits 4100c and 4100e, respectively. The result of each error diffusion process is converted into a code having a fixed length at a fixed length encoding circuit 4100f.

Figure 26:
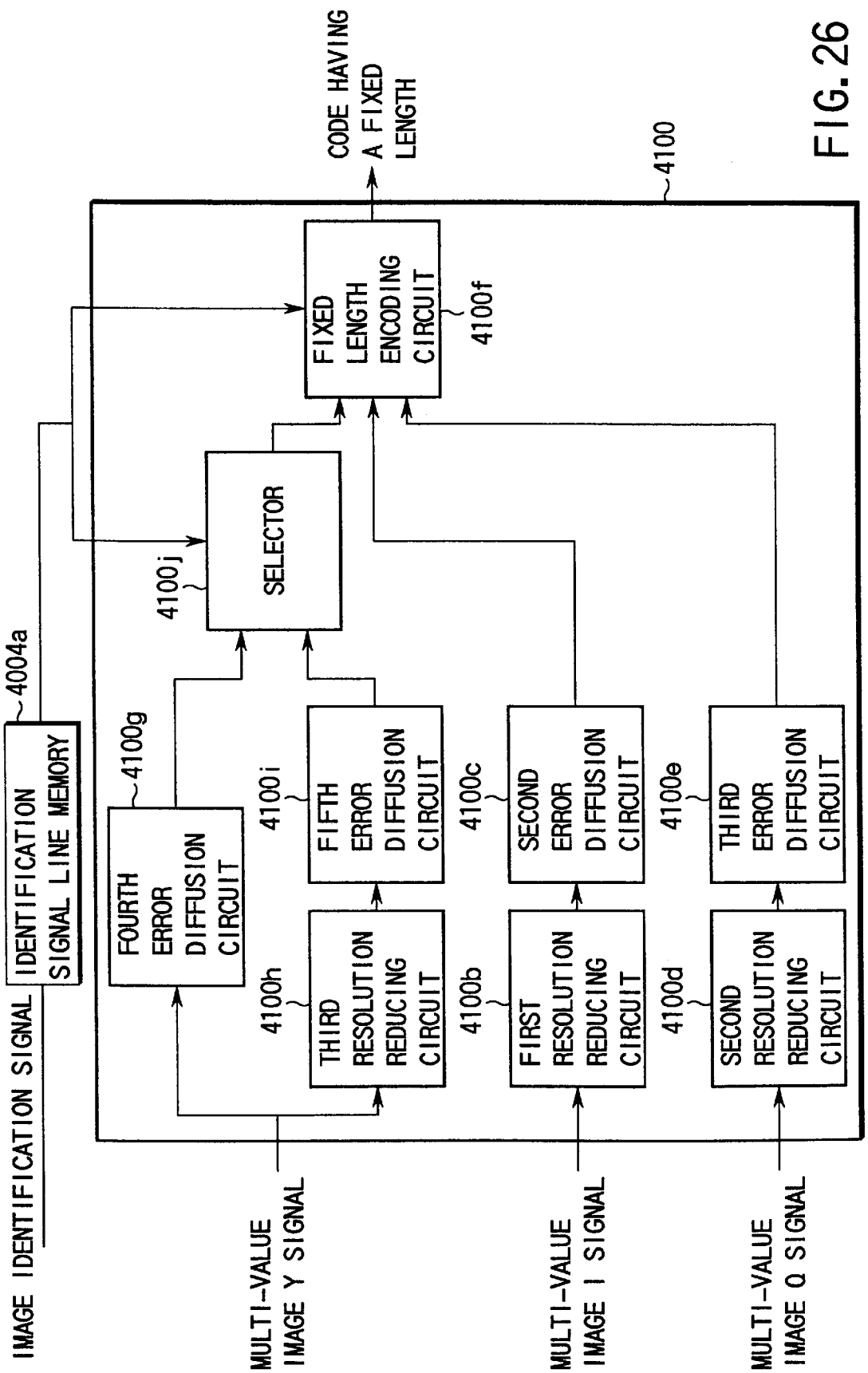
FIG. 26 is a diagram illustrating another example of the configuration of the image encoding portion.

As shown in FIG. 26, the first error diffusion circuit 4100a performing processes switched by image identification signals may have a configuration similar to that shown in FIG. 24 for the first embodiment in which the luminance signal Y is subjected to a resolution-oriented error diffusion process (a fourth error diffusion circuit 4100g) and a tone-oriented error diffusion process (a third resolution reducing circuit 4100h and a fifth resolution reducing circuit 4100i); a selector 4100j selects a result of processing in accordance with an image identification signal; and a fixed length encoding circuit 4100f converts the result into a code in a fixed length. The configurations shown in FIGS. 25 and 26 are described with reference to a 2×2 block as an example and, therefore, an image identification signal is read and used from an image identification signal line memory 4004a as in the first embodiment. FIGS. 25 and 26 indicate like elements with like reference numbers.

As in the first embodiment, the Y signal is subjected to an error diffusion process in the order shown in (c) on FIG. 7 in accordance with the result of identification shown in (b) on FIG. 7 on the original image shown in (c) on FIG. 7. Error propagation occurs as shown in (d) on FIG. 7 for a resolution-oriented block and as shown in (e) on FIG. 7 for a tone-oriented block.

Quantization thresholds for the Y signal are selected using the quantization table shown in FIG. 8A for a resolution-oriented block and using the quantization table shown in FIG. 8C for a tone-oriented block. A tone-oriented block of a Y signal will be described with reference to a process in which pixels are process in pairs as shown in FIGS. 16 and 17 for the first embodiment.

Referring to the IQ signal, original color difference signals as shown in FIG. 27A are first averaged by the first and second resolution reducing circuits 4100b and 4100d in each block (2×2 block consisting of four pixels) as shown in FIG. 27B (reduction of resolution) and are subjected to error diffusion on a block basis by the second and third error diffusion circuits 4100c and 4100e as shown in FIG. 27C. Referring to quantization thresholds, different thresholds are used for the IQ signal as shown in FIGS. 28A and 28B because the IQ signal have different ranges of values. The quantization table includes "0" which is a threshold indicating that there is no color component. This is required for encoding the data of achromatic colors such as block and white.

Figure 30:
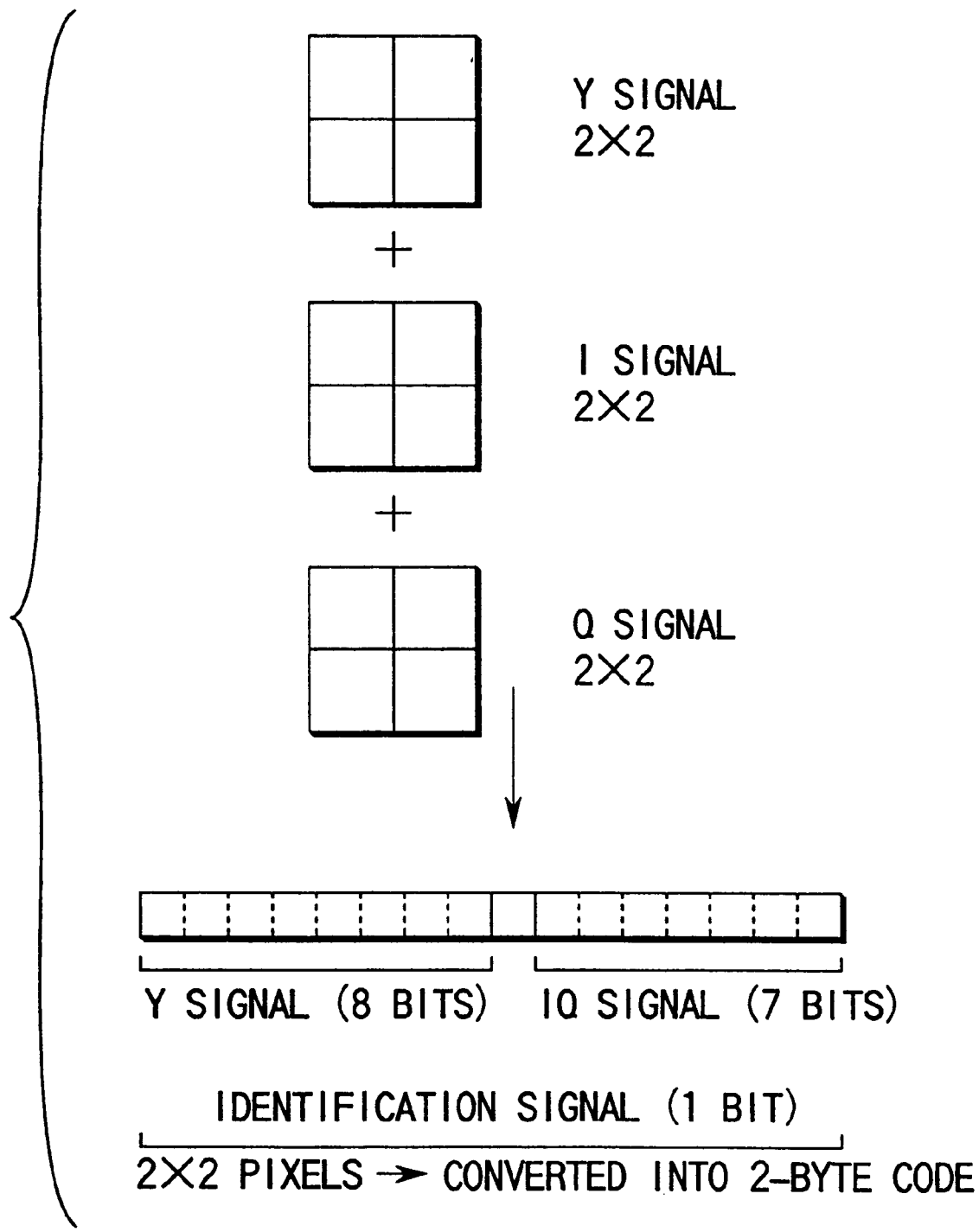
FIG. 30 is a diagram illustrating an example of the configuration of a fixed length (2 bytes) code generated in the fixed length encoding circuit.

The results of error diffusion process on the YIQ signal are encoded according to the code tables shown in FIGS. 29A, 29B and 29C such that the Y signal is encoded into 9 bits including an identification signal for both resolution-oriented and tone-oriented blocks and such that 121 states derived by combining 11 values of each of the IQ signal are encoded into 7 bits. A 2-byte code as shown in FIG. 30 is formed by the 8 bit code of the Y signal, the image identification signal and 7 bits of the codes of IQ signal of the 2×2 block (4 pixels).

Figure 31A:
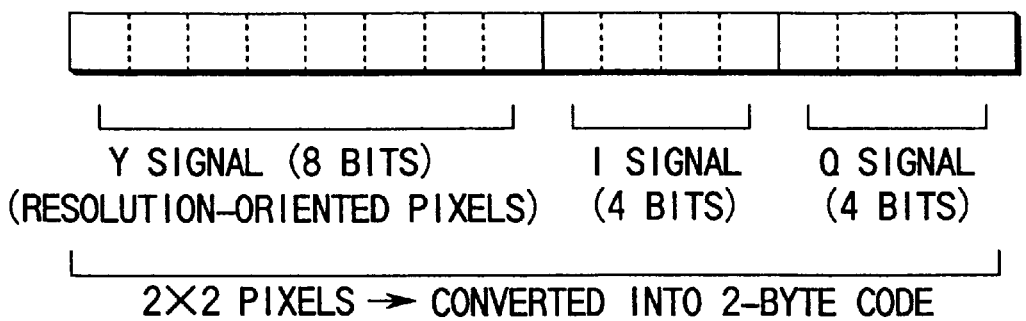
FIGS. 31A, 31B and 31C are diagrams illustrating other example of the configuration of the fixed length code generated in the fixed length encoding circuit.
Figure 31B:
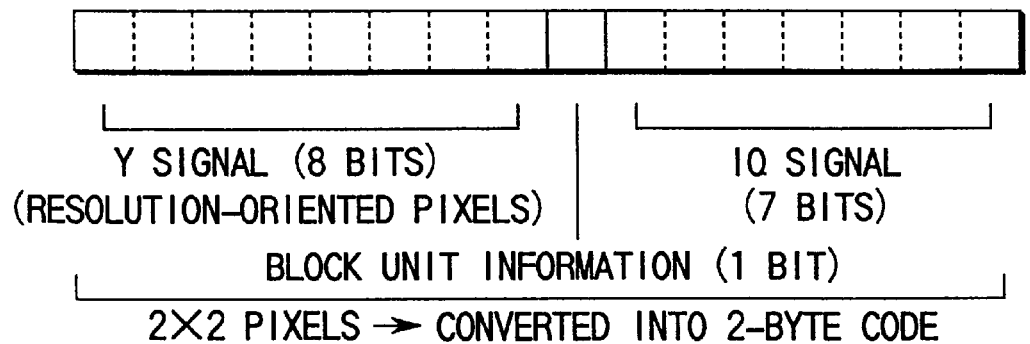
Figure 31C:
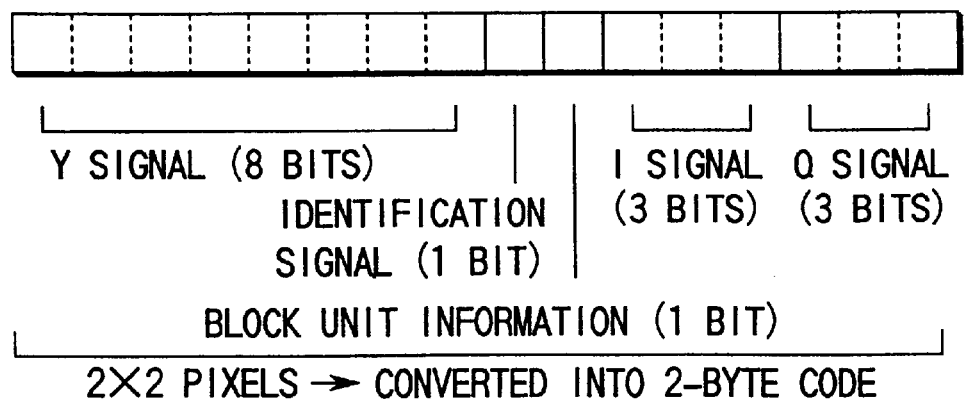

Further, variations of the encoding on a block basis as shown in FIGS. 31A, 31B and 31C can be obtained by changing the processing on the identification signal and the quantization values. Each of the I and Q signal can be encoded into a hexadecimal value as shown in FIG. 31A by processing all of the pixels as resolution-oriented pixels without performing identification on the Y signal. Further, information on a block basis other than the identification information can be encoded into 1 bit as shown in FIG. 31B. By encoding the IQ signal into octal values as shown in FIG. 31C, information on a block basis other than the identification information can be encoded into 1 bit. Although not shown, the hexagonal and octal values of the IQ signal include "0" indicating an achromatic color in accordance with the quantization values shown in FIGS. 28A and 28B.

Figure 32:
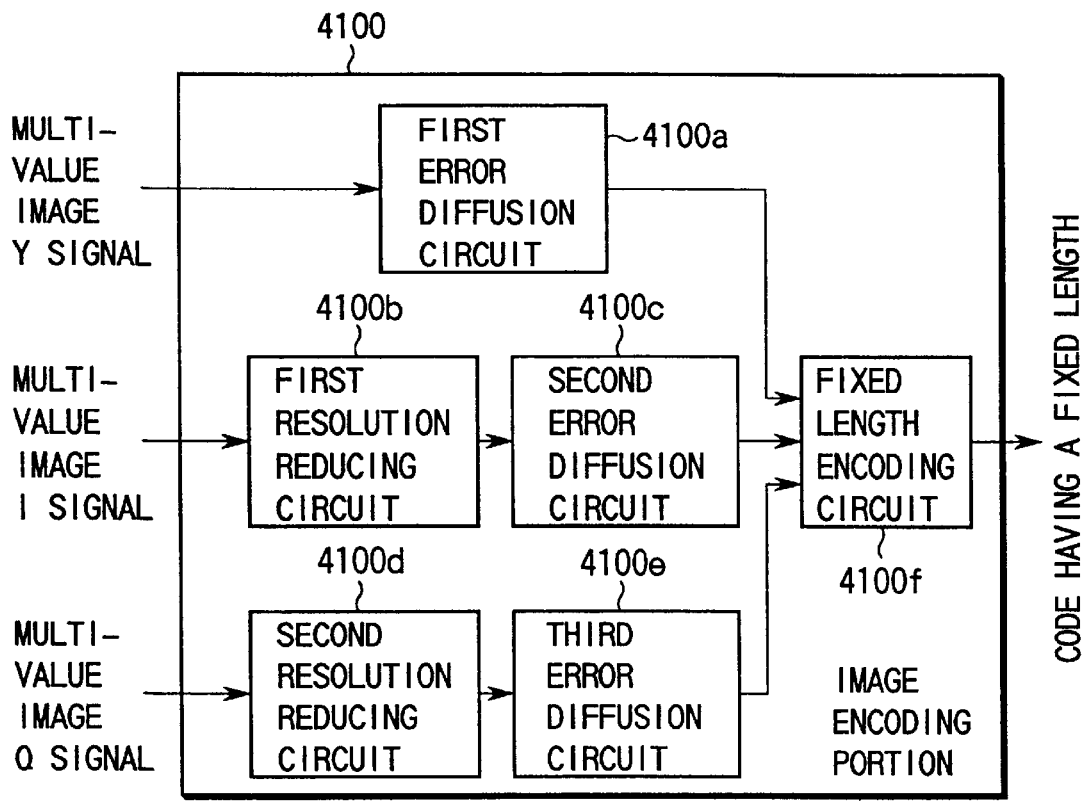
FIG. 32 is a diagram illustrating another example of the configuration of the image encoding portion.
Figure 33:
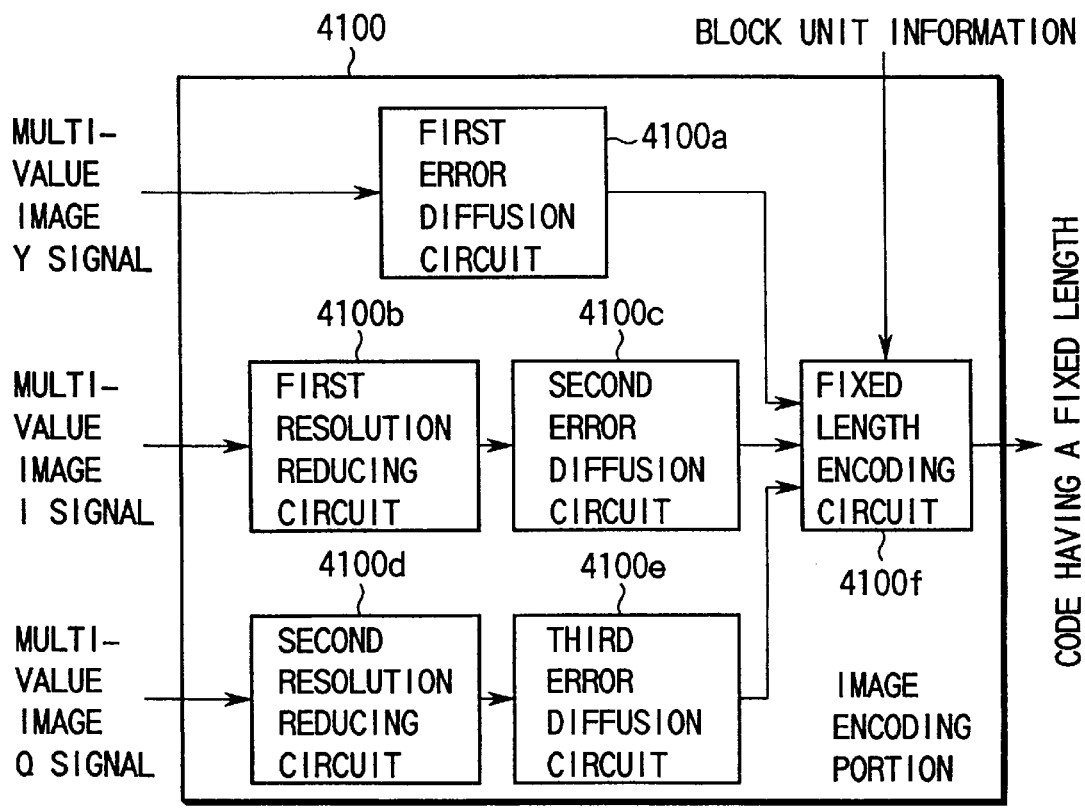
FIG. 33 is a diagram illustrating still another example of the configuration of the image encoding portion.
Figure 34:
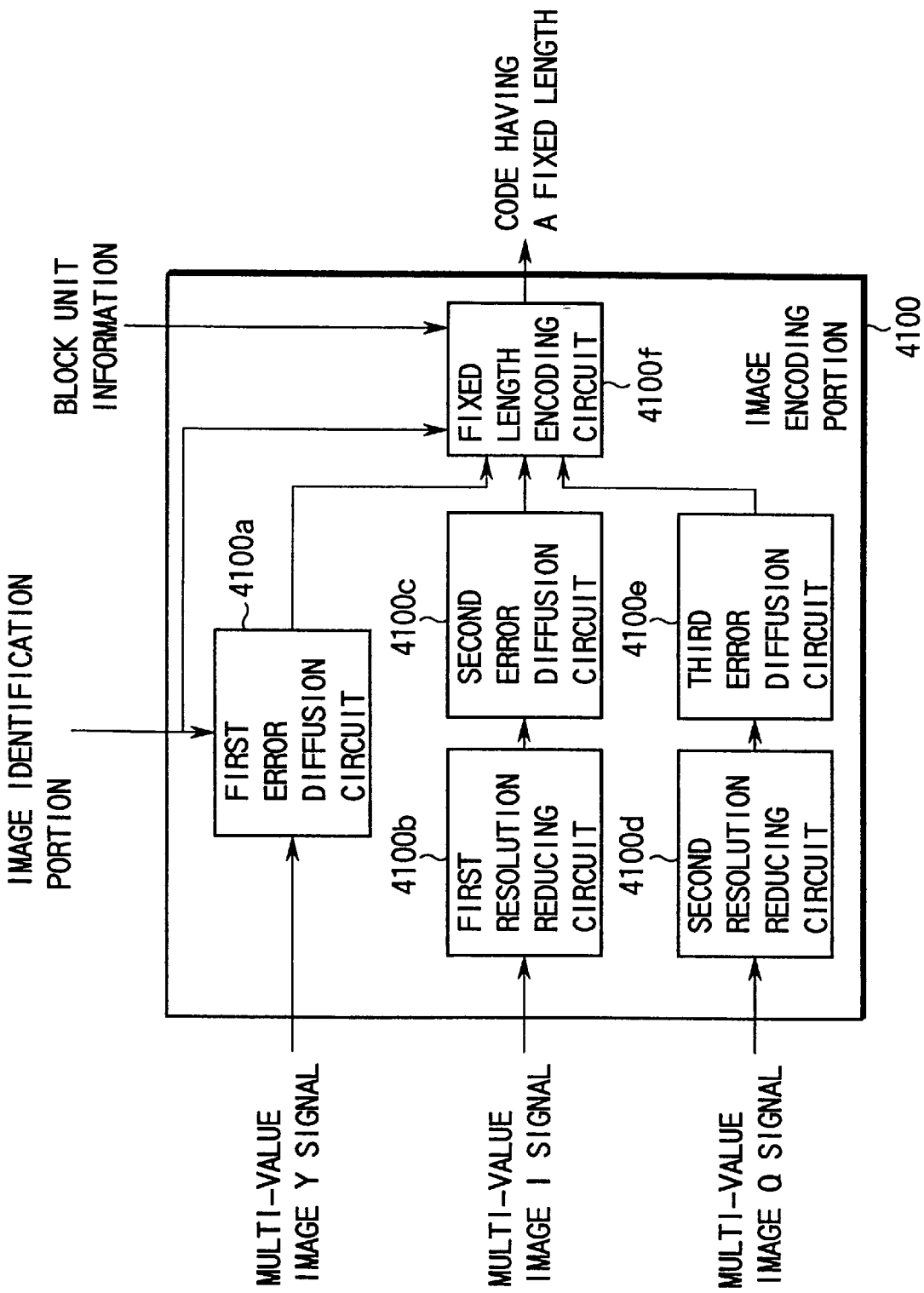
FIG. 34 is a diagram illustrating still another example of the configuration of the image encoding portion.

FIGS. 32, 33 and 34 show an example of the configuration of the image encoding portion 4100 adapted for the coding shown in FIGS. 31A, 31B and 31C. While color difference signals are unconditionally averaged in the above-described process, a color character on a white background can be imaged with clear edges by encoding color difference signals in blocks including both edges and the white background with only the pixels at the edge portions averaged.

Further, while a method involving averaging of pixels has been described as a method for reducing the resolution of a color difference signal, it is possible to use a method wherein a representative pixel value is selected or a method wherein a representative value or average value is selected depending on the color difference value of the block. The reason is that an achromatic pixel can occur, for example, when a block includes values having different signs, e.g., two each pixels having values of +32 and −32. In the case of a photograph, such pixels in a block can be only a local variation. However, if such a block extends for example, across the border between color patches with color difference values having different signs, a gray line appears on the border between the color patches to reduce image quality.

The above-described process compresses data of C, M and Y each having 8 bits and one block consisting of four pixels each having 9 bits into 16 bits, which represents compression by a factor of 1/6. In addition, the data for one block is encoded into 2 bytes which is a data length easily processed by a computer and is stored in the memory 2006. Further, encoding efficiency is also improved from 72 bits/16 pixels achievable with the method of encoding using YIQ signal disclosed in the Article 1 in the section of the background of the invention to 64 bits/16 pixels. The scale of a circuit can be decreased because the block size used for encoding is small.

Figure 35:
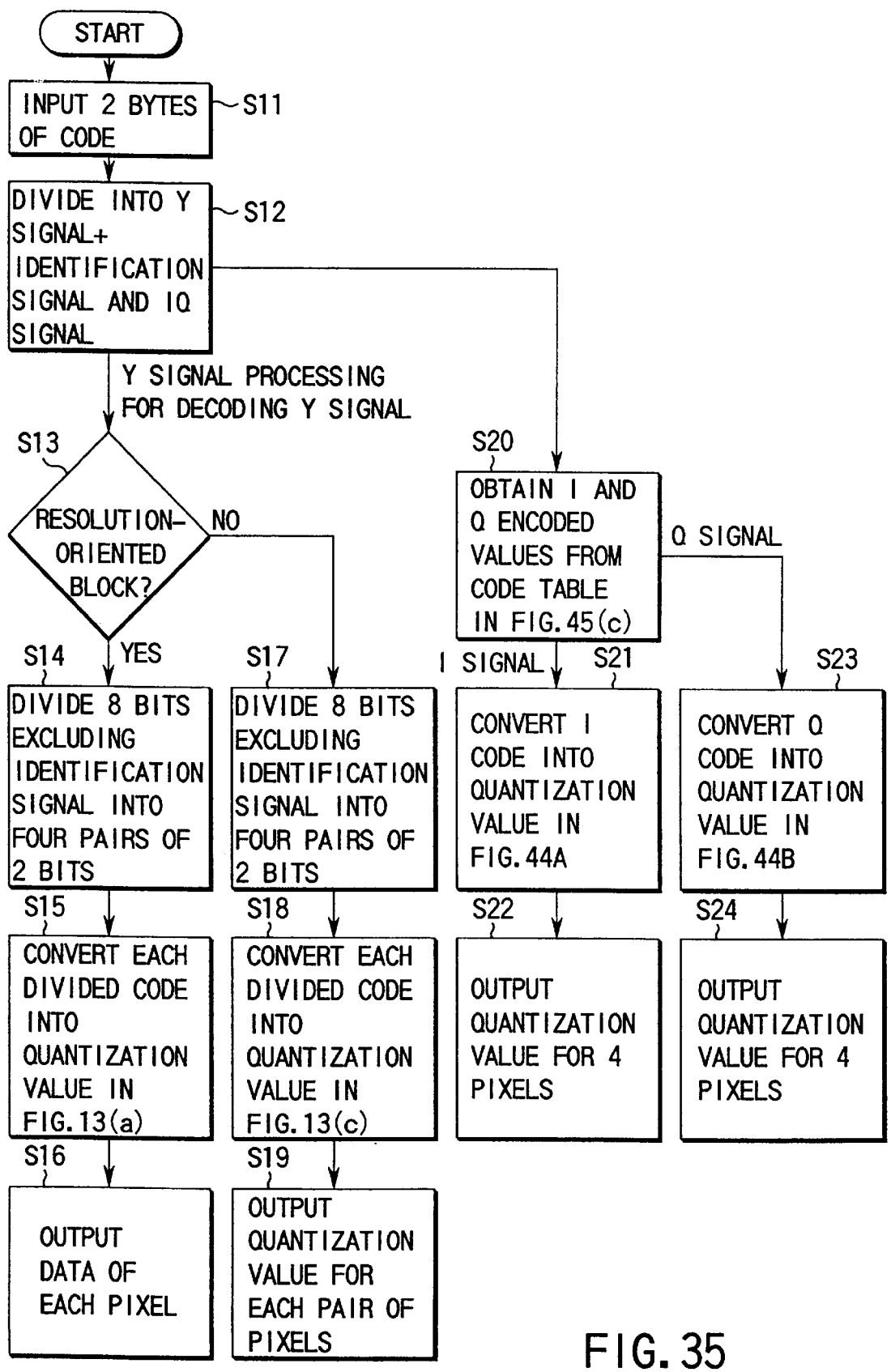
FIG. 35 is a flow chart illustrating the operation of the image decoding portion.

The image decoding portion 4007 will now be described with reference to the flow chart shown in FIG. 35. First, 2 bytes of compressed data for one block is input (step S11), and the data is separated into Y signal information, identification information for the same and I and Q information (step S12). It is determined whether the Y signal is resolution-oriented or tone-oriented from the identification signal (step S13). If it is a resolution-oriented block, the block is divided into data for each pixel (step S14). The code of each pixel is decoded into a quantization value with reference to a table as shown in FIG. 8A, and the decoded data of each pixel is output (step S16). If it is a tone-oriented block, the block is divided into data for each two pixels (step S17). Each code is decoded into a quantization value with reference to a table as shown in FIG. 8C (step S18), and the decoded data for two pixels is output (step S19).

Encoded values of the IQ signal are obtained from the code table shown in FIG. 29C (step S20). The I signal is decoded into quantization values with reference to a table as shown in FIG. 28A (step S21), and quantization values for four pixels are output (step S22). Similarly, the Q signal is decoded into quantization values with reference to a table as shown in FIG. 28B (step S23), and quantization values for four pixels are output (step S24).

The YIQ/CMY conversion portion 4008 converts Y, I and Q into C, M and Y using Equations 4 through 6 above.

Next, the CMY correction portion 4009 will be described. When a plurality of signals can be independently encoded as in the second embodiment, input in the range from 0 to 255 results in output also in the range from 0 to 255 if error diffusion is performed using the thresholds and quantization values shown in FIGS. 8A, 8B and 8C. However, when an error diffusion process is performed on a plurality of converted signals as in the present embodiment, the ranges of input and output signals of the error diffusion process portion will be equal when the thresholds and quantization values shown in FIGS. 8A, 8C, 28A and 28B are used. However, the ranges of the values obtained by the CMY-YIQ conversion and YIQ-CMY conversion which are input and output processes xfor error diffusion are not necessarily equal.

For example, let us assume that the image decoding portion 4007 outputs Y=0, I=−122 and Q=−107. All of the three signals are within the ranges of values shown in FIGS. 8A, 8B, 28A and 28B. That is, they satisfy:

$0 \leq Y \leq 255$ $153 \leq I \leq 153$ $-134 \leq Q \leq 134$

If Y=0, I=−122 and Q=−107 are substituted in Equations 4 through 6 (decimal fractions are cut off):

C=−182, M=101, Y=48

Thus, the output values are output the input range of the CMY/YIQ conversion portion 4008 as follows.

$0 \leq C, M, Y \leq 255$

Then, the CMY correction portion 4009 performs a process of cutting off the data out of the input range as follows.

If C, M, Y≤0, C, M, Y=0

If C, M, Y>255, C, M, Y=255

Since all of the YIQ signal are basically subjected to multi-value error diffusion, it is less likely that error diffusion results in a combination of YIQ signal significantly shifted from the input C, M and Y ranges. Thus, severe deterioration of image quality rarely occurs.

Figure 36:
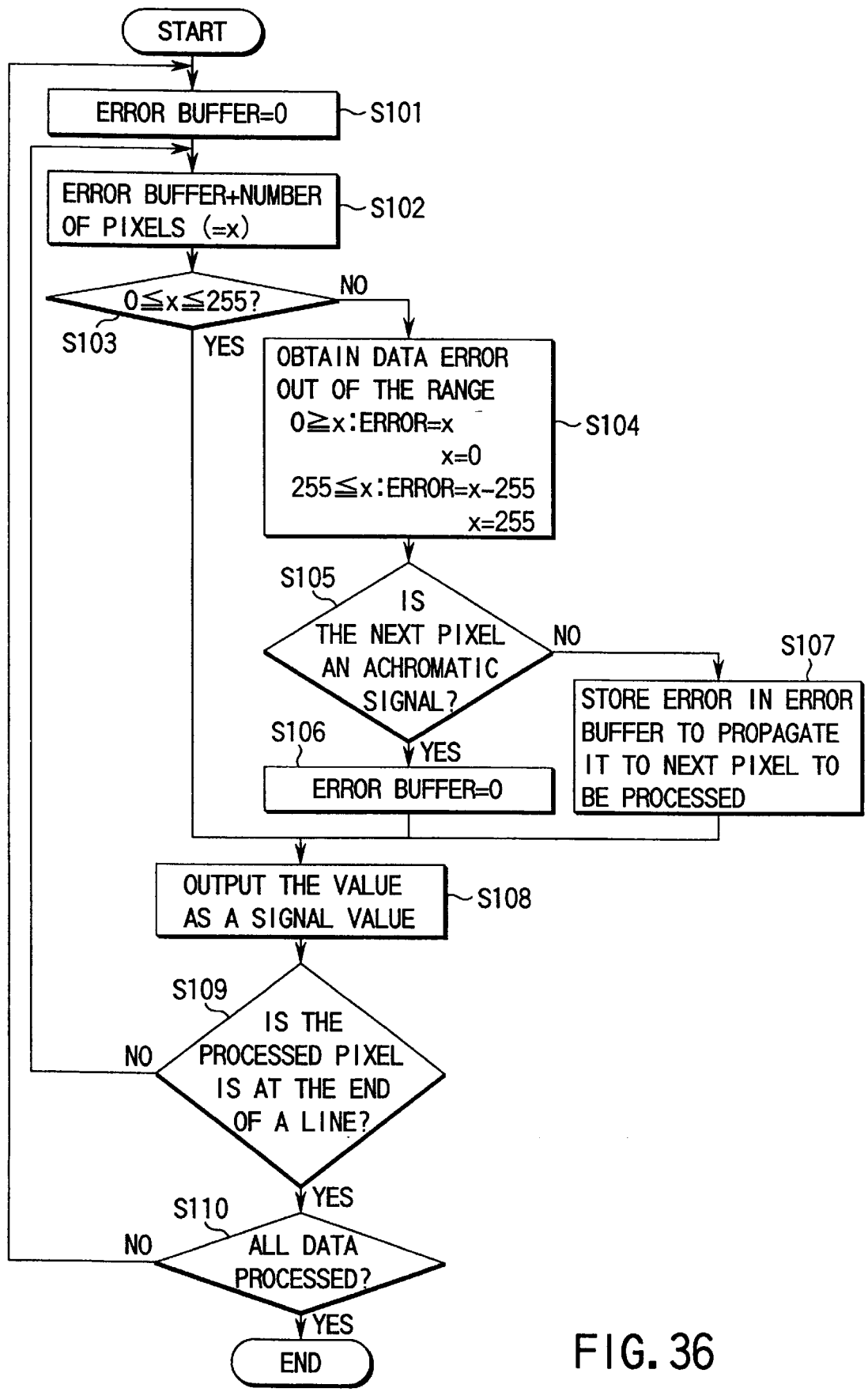
FIG. 36 is a flow chart illustrating the procedure for an error diffusion process performed on each of CMY signal in a CMY correction portion.

If an error diffusion process as shown in the flow chart of FIG. 36 is carried out on each of CMY signal at the CMY correction portion 4009, those signals can be corrected to values closer to the original image while maintaining macro-density. At step S105 in the flow chart of FIG. 36, it is checked whether neighboring pixels are achromatic or not. If they are achromatic, a converted error is not diffused to the neighboring pixels. That is, even if an errors is diffused to the white background and a black image, the error will not be used in the vicinity of the point of occurrence of the error if the neighboring pixels are white and the error is negative and if the neighboring pixels are black and the error is positive where the white and black backgrounds have values "0" and "255", respectively. Thus, even when a chromatic pixel appears in a place apart from the point of occurrence of an error with achromatic pixels interposed therebetween, there is no possibility that the pixel will be corrected into a color different from the original pixel value as a result of the addition of an error irrelevant to color correction.

In the third embodiment of the invention, an error checking process is carried out by converting an ink amount signal which is a signal processed by a printer into a luminance/color difference type signal. Therefore, even when the luminance/color difference signal is converted into an ink amount, an output image within a color reproduction range represented by ink can be obtained only by performing a process to cope with overflow.

While a compression process is performed after the RGB/CMY conversion portion 4002 converts an input image signal such that it falls within the color reproduction range of an output device (image forming means), the RGB/CMY conversion portion 4002 may perform Log conversion or the like to convert the signal into representation associated with an ink amount and perform correction such that the signal fall within the color reproduction range during the compression or decoding process with reference to a look-up table (LUT) as shown in FIG. 50. Although FIG. 50 shows a conversion table on a CMY space, a conversion table on a YIQ space may be used to directly correct the color reproduction range on the YIQ space during compression or decoding.

A Fourth Embodiment

Figure 37:
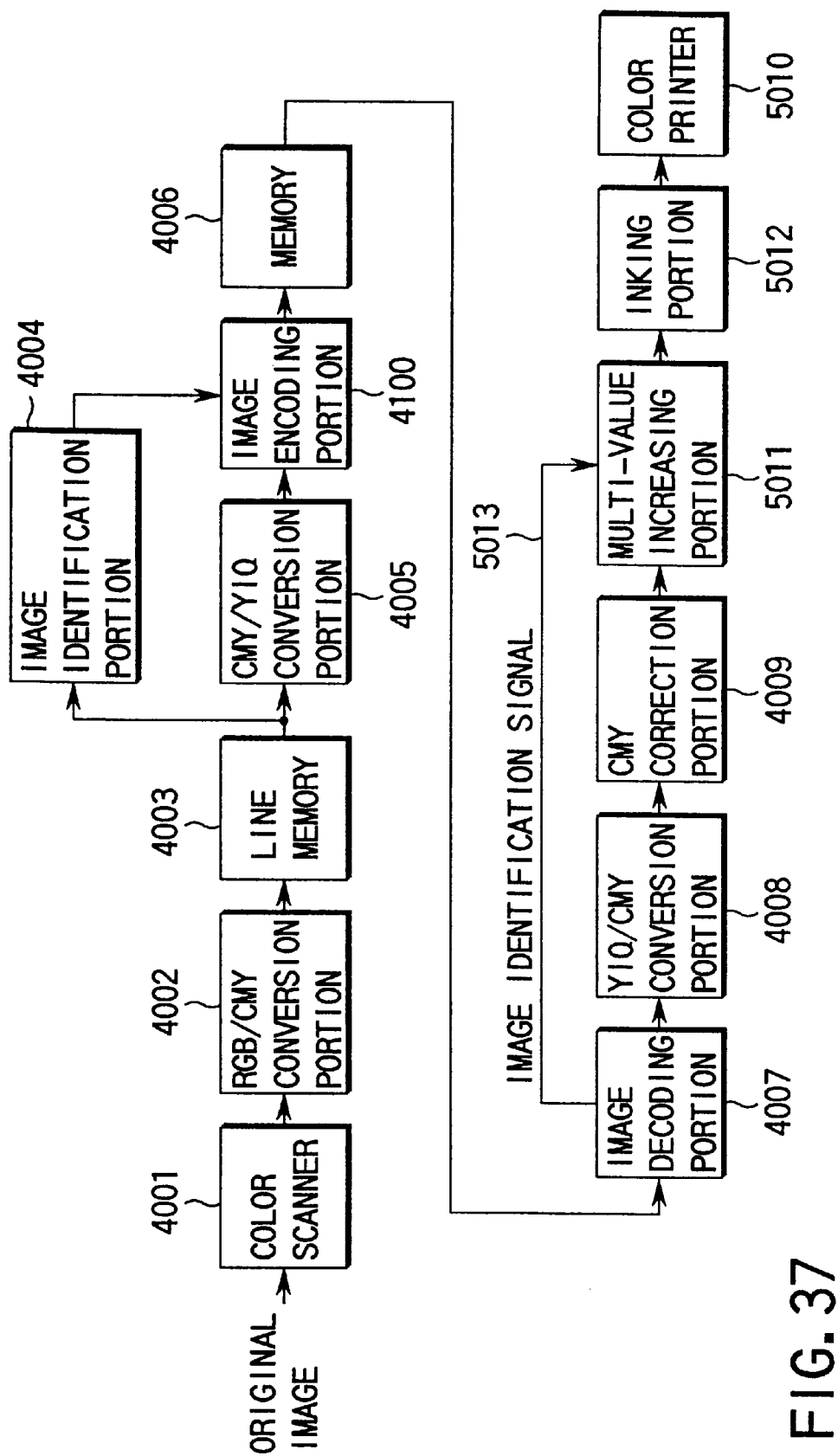
FIG. 37 is a diagram schematically illustrating an example of the configuration of major parts of a digital color copier according to a third embodiment of the invention.

A description will now be made on a modification of the digital color copier according to the third embodiment (refer to FIG. 24). FIG. 37 shows an example of the configuration of a digital color copier according to the fourth embodiment of the present invention employing a color printer which prints with four colors, that is, C, M, Y and K. FIGS. 37 and 24 indicate like element with like reference numbers, and description will be made only on different elements. Specifically, the color printer 4010 in FIG. 24 is replaced with a color printer 5010 that prints using four colors, that is, C, M, Y and K in FIG. 37. The configuration shown in FIG. 37 is different in that it further includes a multi-value increasing portion 5011 and an inking portion 5012 and in that an image identification 5013 from the image decoding portion 4007 is used by the multi-value increasing portion 5011.

The color printer 5010 can print in the color K in addition to other color inks C, M and Y to allow black which has been rendered by overlapping the three colors C, M and Y to be printed using only the K ink.

This makes it possible to reduce the amount of ink and to improve rendering of black.

The inking portion 5012 performs a process expressed by Equation 7 shown below to generate a K signal. The cost reduction becomes more significant, the closer the ink ratio in Equation 7 to 100%.

The value of each of C, M, Y and K substituted in Equation 7 is in the range from 0 to 255.

gcr=k×min (c, M, Y)

where min represents the minimum values of C, M and Y and k represents an ink ratio which is "1" for 100% and "0" for 0%.

C'=(C−K)÷(255−K)

M'=(M−K)÷(255−K)

Y'=(Y−K)÷(255−K)

K=gcr    Equation 7

Figure 38:
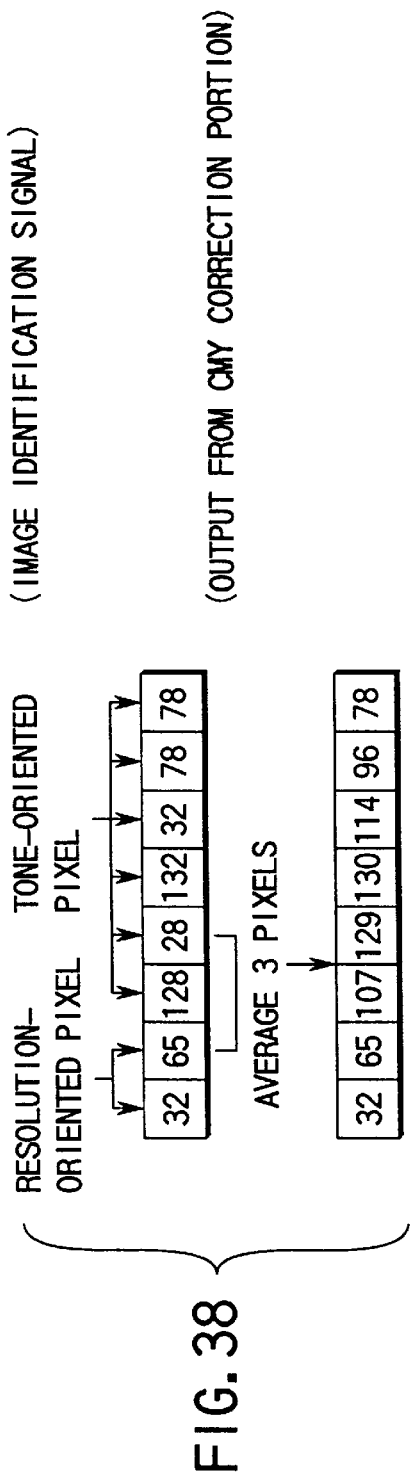
FIG. 38 is a diagram illustrating a process in a multiple value increasing portion.

Next, the multi-value increasing portion 5011 will be described. As shown in FIG. 38, it outputs the value of a pixel which is a value obtained by averaging the values of the pixel of interest and the preceding and succeeding pixels(for example, average of interest of 3 pixel) if the pixel is determined to be a tone-oriented pixel from the image identification signal from the image decoding portion 4007. If the preceding and succeeding values are not completely the same, the number of multiple values per pixel that can be rendered will be greater than the quantization number used during compression. Since the spatial averaging is basically carried out only on tone-oriented pixels, the transition of the values of the tone-oriented pixels becomes smooth without any reduction in the resolution. The effect of the process shown in FIG. 38 becomes more significant when the process is combined with the inking portion 5012.

The image encoding portion 4100 encodes luminance and color difference signals separately. As a result, achromatic pixels having a color difference value "0" can occur in regions having light tones.

Figure 39:
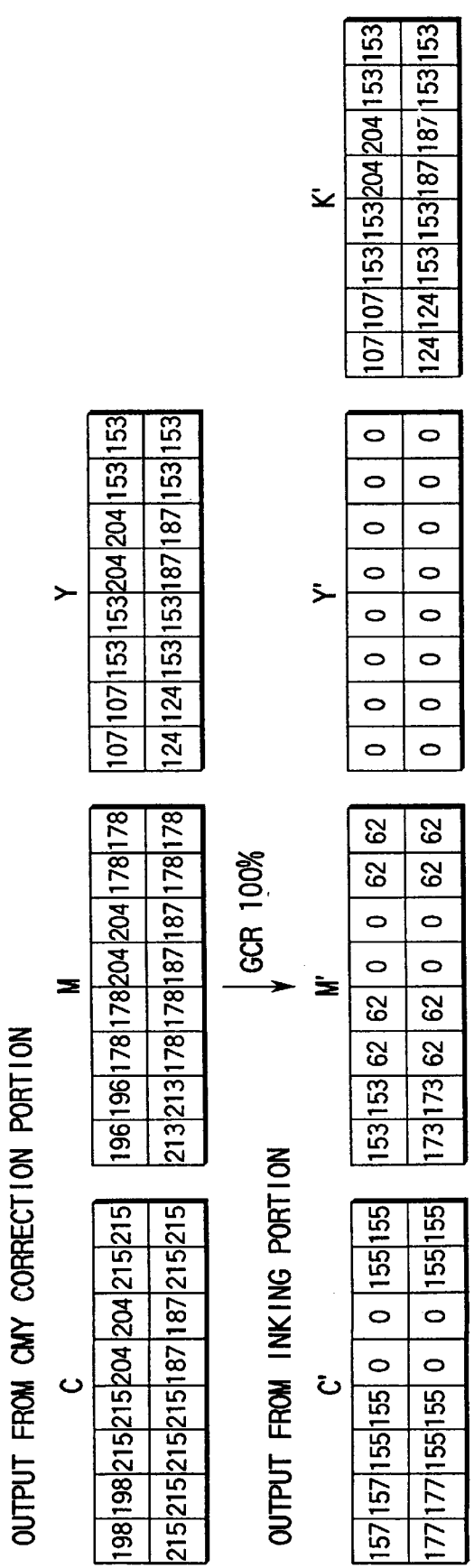
FIG. 39 is a diagram illustrating the effect of the process in the multiple value increasing portion.
Figure 40:
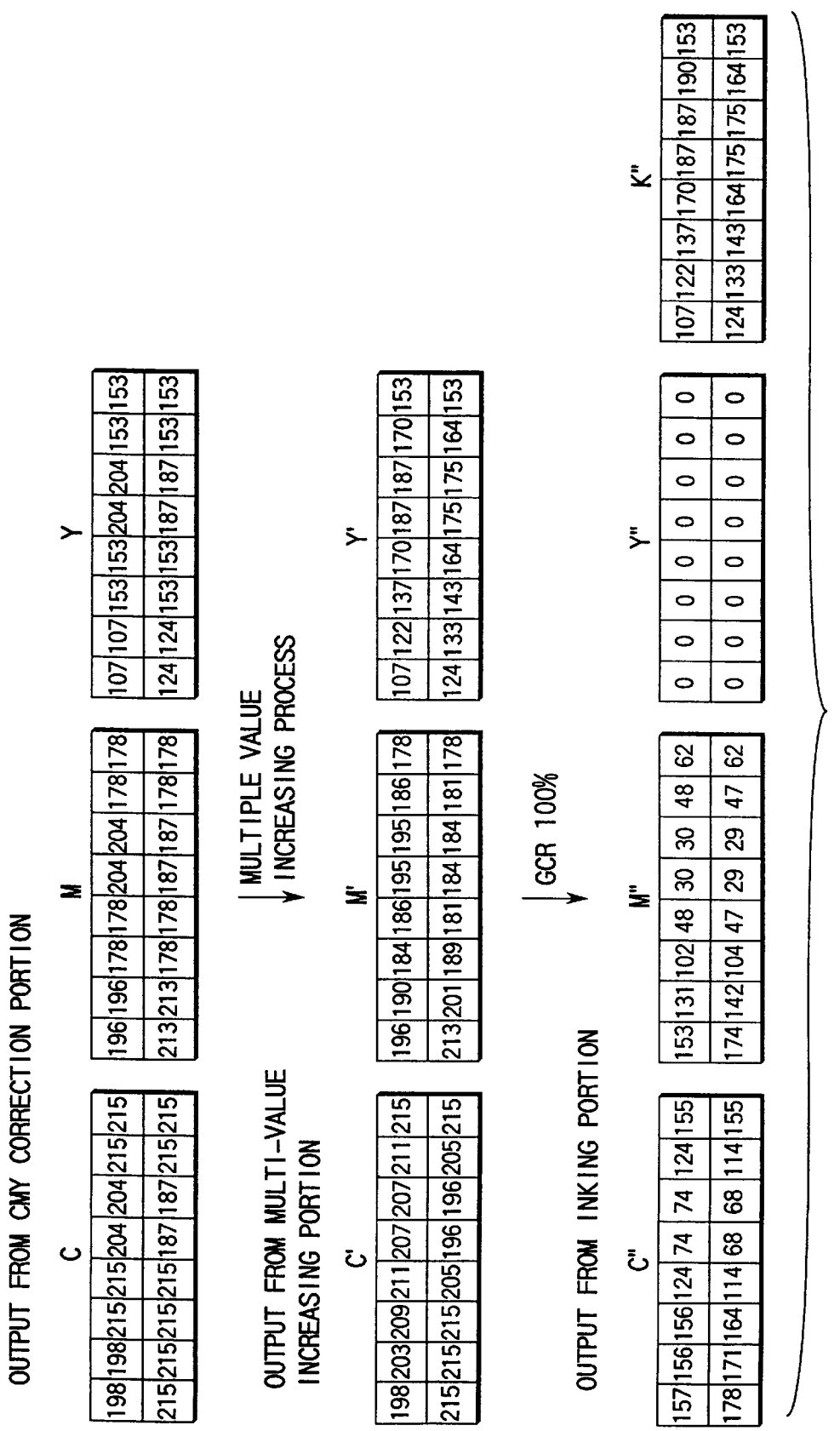
FIG. 40 is another diagram illustrating the effect of the process in the multiple value increasing portion.

FIGS. 39 and 40 show examples of the outputs from the inking portion 5012 one of which has past through the multi-value increasing portion 5011 and the other has not. The colors which have not passed through the multi-value increasing portion 5011 are output at values which are spaced apart from each other as shown in FIG. 39, which means that only a rendering capability on a binary basis can be obtained even through the data are maintained using multiple values. On the other hand, when the multi-value increasing portion 5011 performs a multi-value increasing process as shown in FIG. 38, the number of multiple values per pixel is increased as shown in FIG. 40. This makes it possible to effectively utilize the tone rendering capability of an output device such as the printer 5010.

The multi-value increasing portion 5011 that performs such a process can be used not only for decoding data encoded according to the method of encoding of the present invention but also for decoding data encoded using various methods for encoding.

Figure 41:
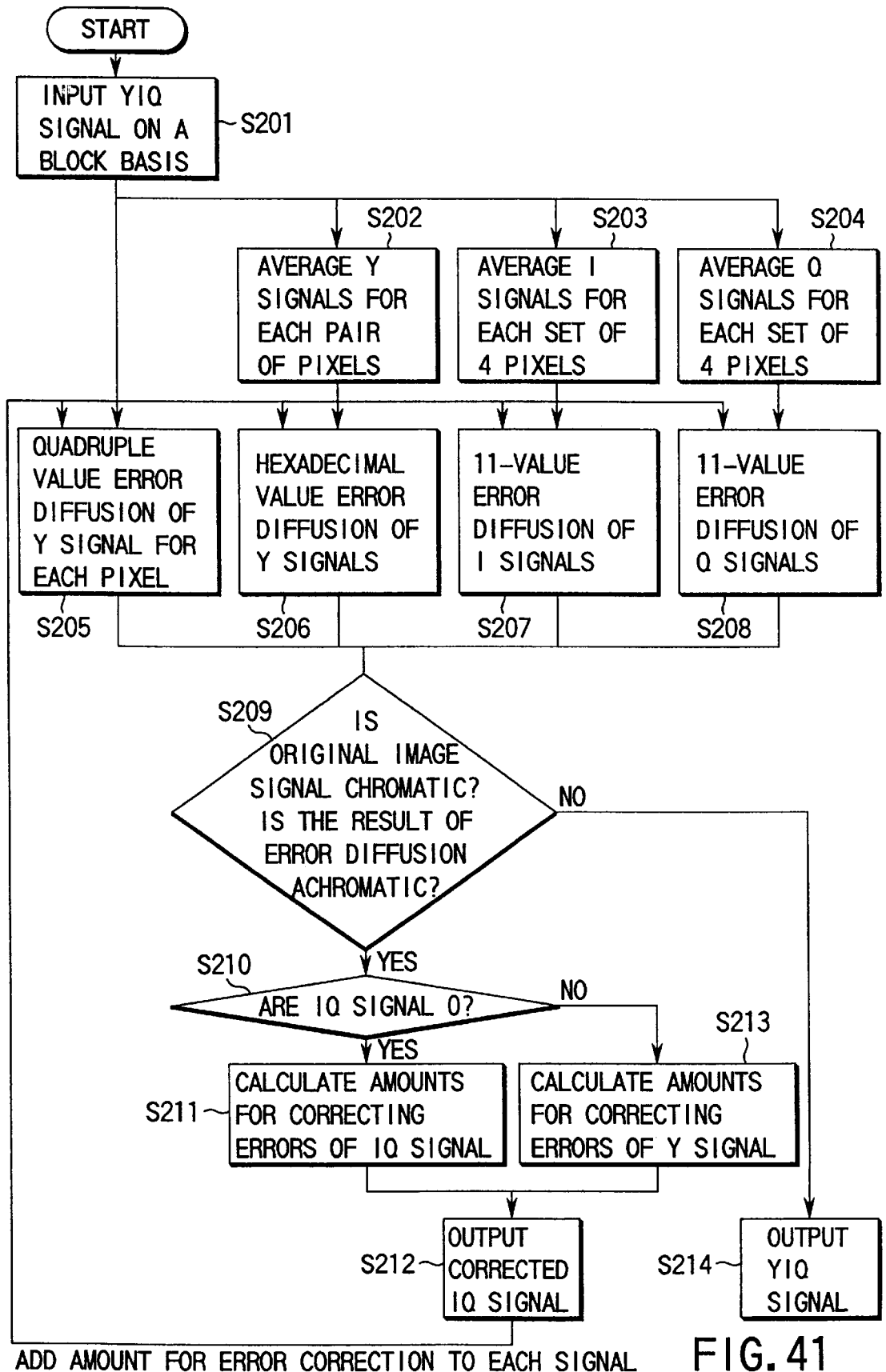
FIG. 41 is a flow chart illustrating the operation of an achromatizing process on chromatic colors during the compression process in the image encoding portion.

Referring to achromatization of chromatic pixels attributable to luminance and color difference error diffusion during compression, the image encoding portion 4100 can perform a process of correcting the conversion of chromatic pixels into achromatic pixels due to the compression process in accordance with the flow chart shown in FIG. 41. Specifically, when color component signals in each block to be processed have been changed from chromatic signals to achromatic signals as a result of luminance and color difference error diffusion (step S209), such conversion of chromatic pixels into achromatic pixels can be suppressed by calculating error correction amounts for the IQ signal when the IQ signal are "0" (steps S210 and S211) and calculating an error correction amount for the Y signal when the IQ signal are not "0" (steps S210 and S213). In this case, however, the reproduction capability is slightly reduced because no achromatic quantization value is used.

While the multi-value increasing process is carried out only in tone-oriented pixels in the above description, this process may be used regardless of the characteristics of pixels to provide an advantage in that deterioration of resolution will be less noticeable on resolution-oriented pixels in a high resolution image of 400 dpi, 600 dpi or the like and in that smoothness will be improved around edges of characters or the like because there are great differences between the values of pixels.

Further, although the multi-value increasing process is performed by the color image encoding portion 4100 in the above description, this process provides the same advantages when applied to the result of decoding at the monochrome image encoding portion 1100 in the first embodiment or results of decoding obtained by subtracting quantization values from multiple values as disclosed in Articles 1 through 4 cited in the section of the background art.

Figure 42A:
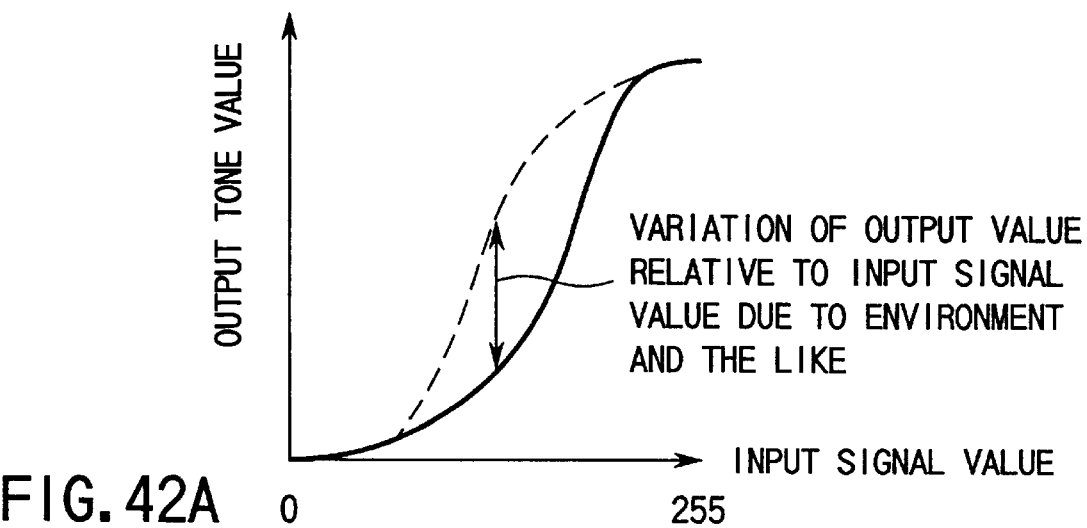
FIGS. 42A, 42B and 42C are diagrams illustrating the relationship between input signal values and output tone values input to and output from an output device such as a printer as an effect of the process in the multiple value increasing portion.
Figure 42B:
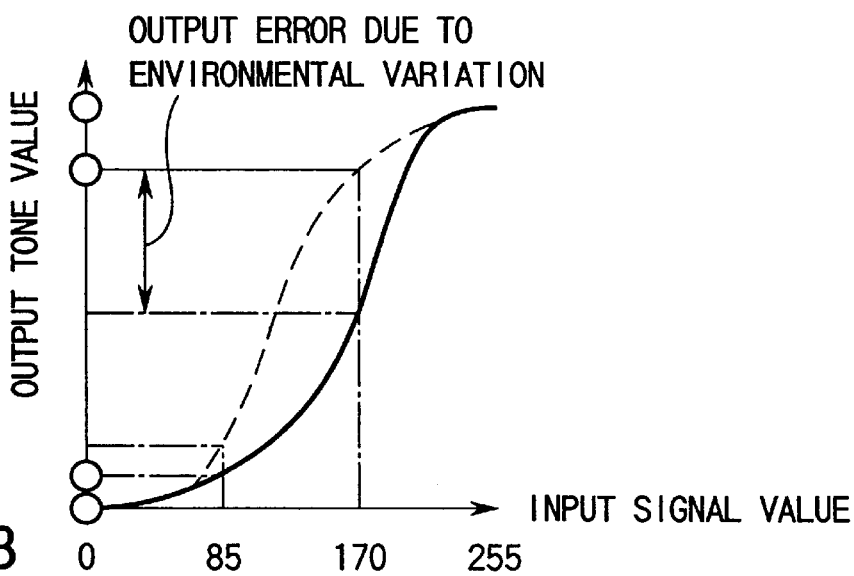
Figure 42C:
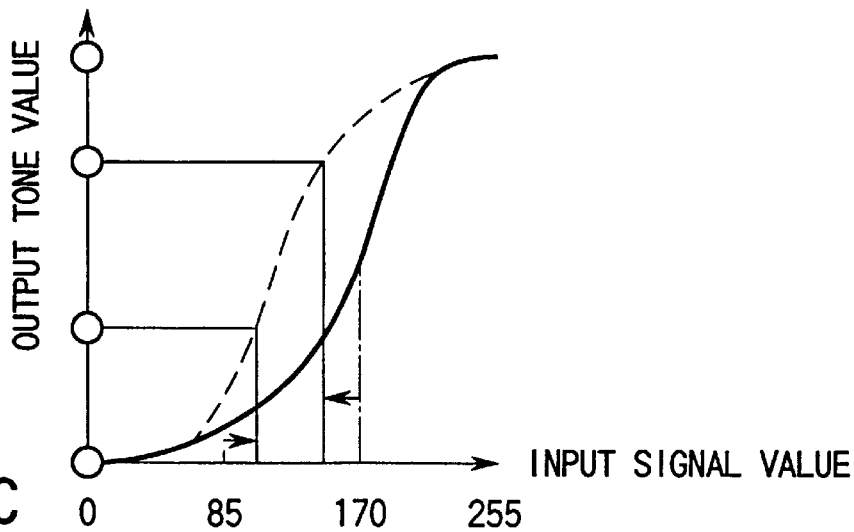

Especially, let us consider a case wherein multi-value signals are output by an output device such as an electrophotographic printer in which tone characteristics can vary depending on the environment and the like as shown in FIG. 42A. Then, when a small number of quantization values are input as fixed values, actually output tone values will be significantly different from the tone values to be output. Further, with the fixed quantization values shown in FIG. 42B, variations in the environment directly affect an image to make the image as a whole dark. As shown in FIG. 42C, the use of the multi-value increasing portion 5011 results in spatial variation of the output associated with the input signal value "170" to suppress the impact of the environmental variations on image quality.

When an output device such as a display having a coarse resolution is used, since the multi-value increasing process increases the multiple values, an output with reduced noise can be obtained to improve image quality even if resolution is partially deteriorated as a result of a process on pixels including resolution-oriented pixels because fine adjustment can be carried out at the output device.

An error diffusion process as shown in the flow chart in FIG. 36 at the CMY correction portion 4009 similarly increases the number of multiple values per pixel to provide the same effect as that of the multi-value increasing portion 5011.

While the process at the multi-value increasing portion 5011 is provided downstream of the CMY correction portion 4009, it may be provided upstream of the YIQ/CMY conversion portion 4008, upstream of the CMY correction portion 4009 or downstream of the inking portion to achieve the same effect.

Figure 51A:
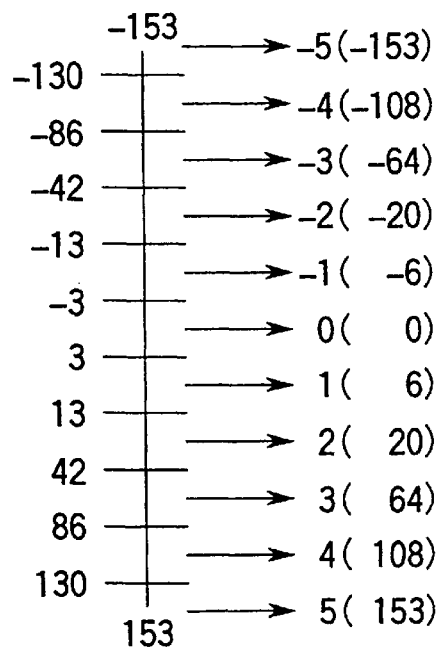
FIGS. 51A and 51B are diagrams illustrating examples of quantization tables used for increasing quantization values in the image encoding portion with increasing achromatic properties.
Figure 51B:
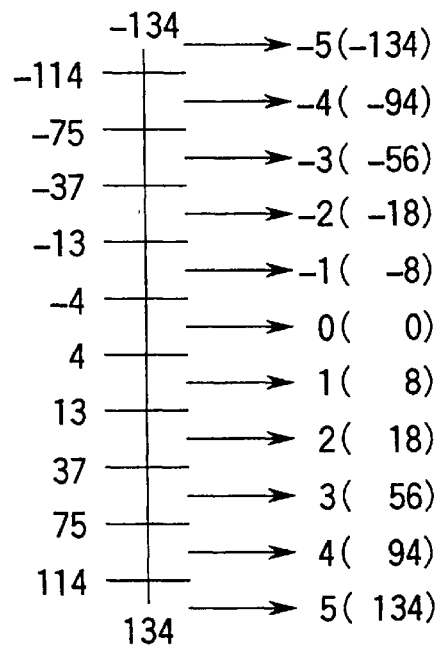

Further, if the image encoding portion 4100 performs fine quantization on color differences in the vicinity of an achromatic axis as shown in FIGS. 51A and 51B, the transition of values after inking will be similarly made smooth.

In addition, correction of an achromatic color into a chromatic color or vice versa during compression or fine quantization of color difference components in the vicinity of achromatic colors or the increase of the number of multiple values of a decoded image will be effective in improving image quality not only in the method of compression of the present embodiment but also in other methods of compression involving conversion into luminance/color difference signals.

A Fifth Embodiment

A description will be made on another modification of the digital color copier (refer to FIG. 24) according to the third embodiment. The configuration of the digital color copier of the present embodiment is basically the same as that shown in FIG. 24 except the process in the image encoding portion 4100.

Figure 43:
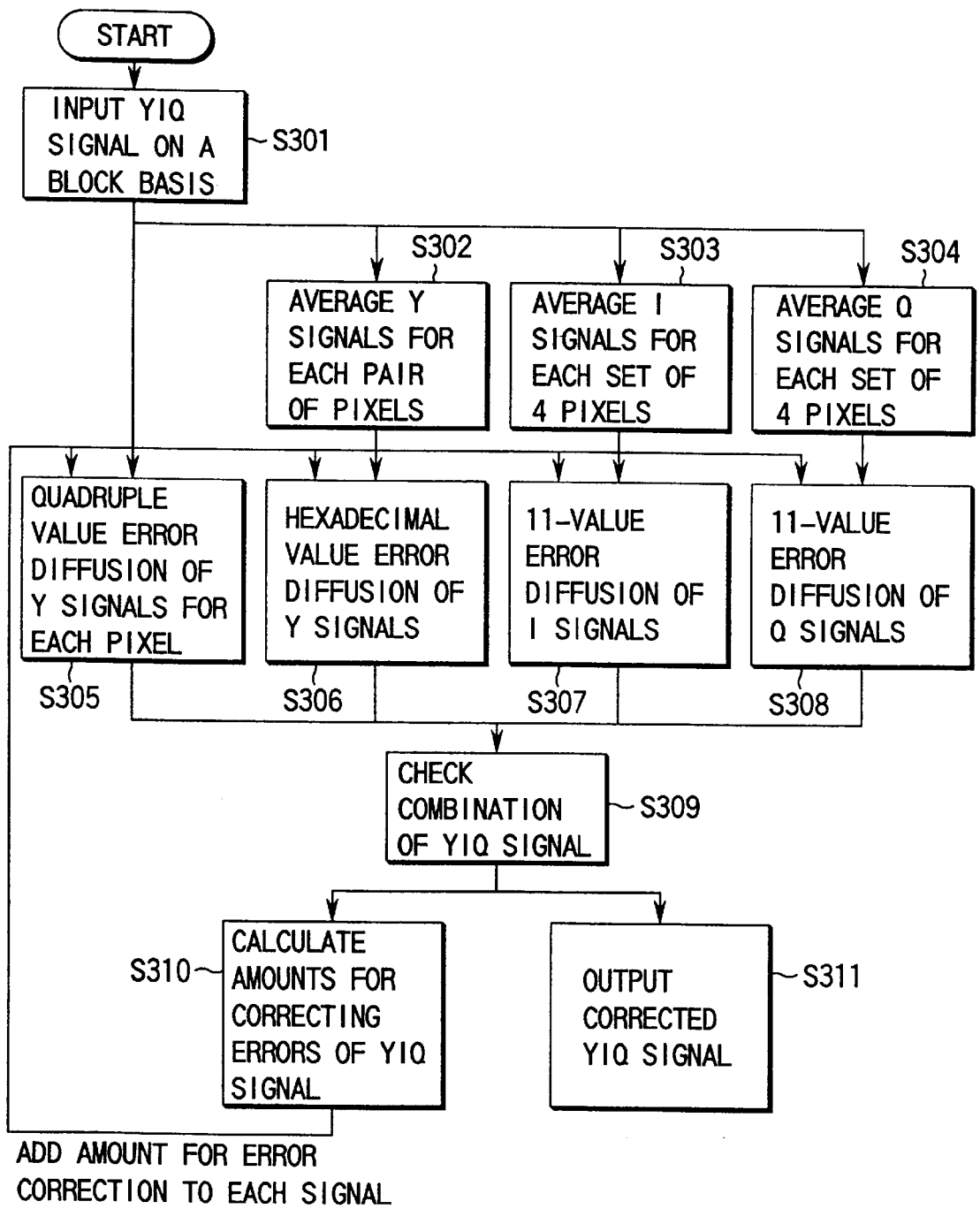
FIG. 43 is a flow chart illustrating the operation of an image encoding portion of a digital color copier according to a fifth embodiment of the present invention.

FIG. 43 is a flow chart showing the process at the image encoding portion 4100. It is determined whether the combination of luminance and color difference of each pixel which has been subjected to error diffusion during encoding has moved out of the range (0–255) on the CMY signal (step S301 through S309). If it is out of the range, the combination of luminance and color difference is re-selected such that it falls within the range and the error of the selected signal is diffused to neighboring pixels (steps S310 and S311 and steps S305 through S308).

A Sixth Embodiment

Figure 44:
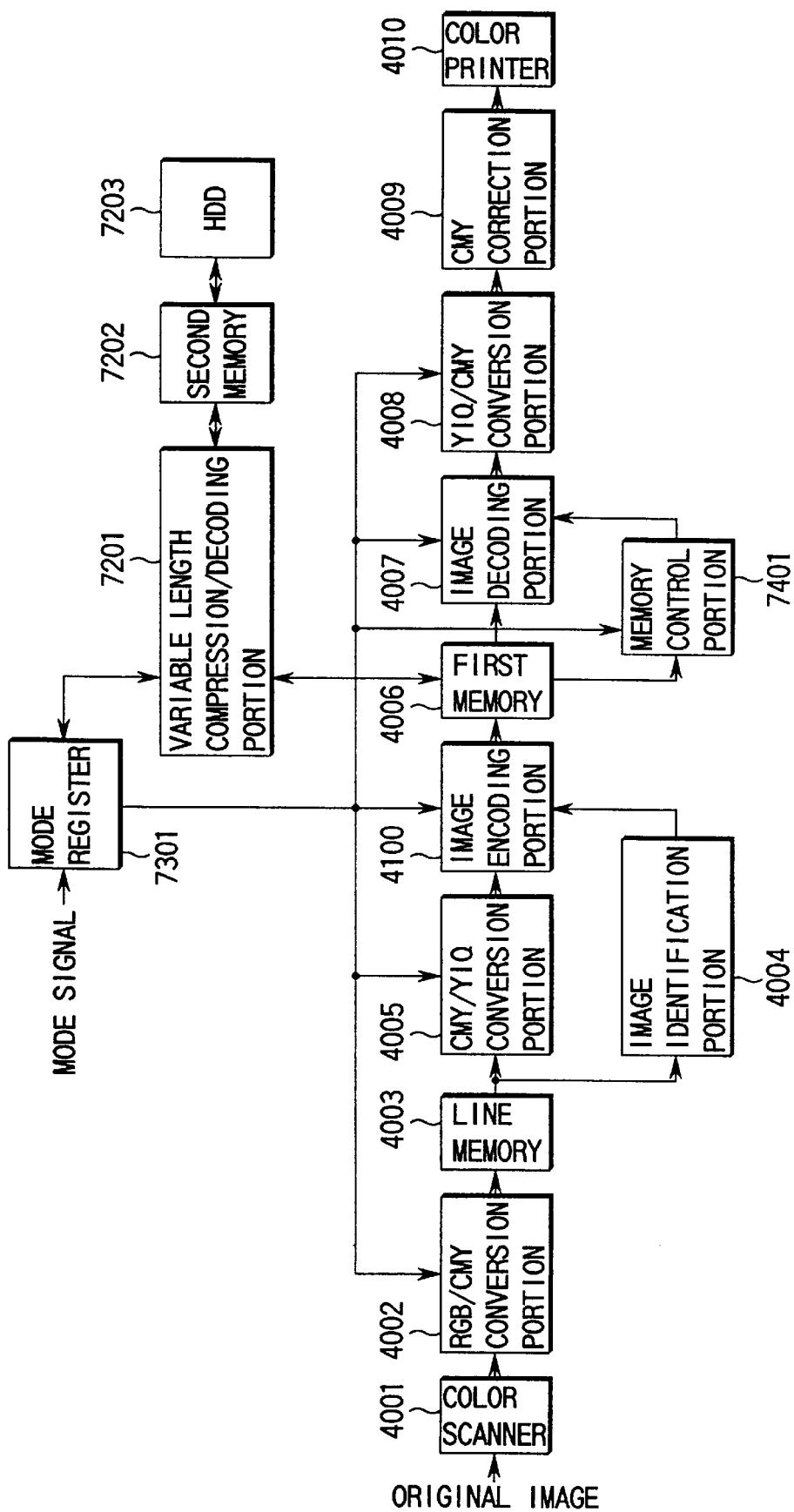
FIG. 44 is a diagram schematically illustrating an example of the configuration of the digital color copier in which processes of image compression, decoding and rotation are carried out based on mode signals.

FIG. 44 is a block diagram schematically illustrating an example of the configuration of major parts of a digital color copier which is an image forming apparatus employing an image encoding/decoding apparatus according to the present invention.

A brief description will be made on the operation of the digital color copier (hereinafter simply referred to as "copier") shown in FIG. 44. When a user operates a front panel (not shown) of the copier to input a mode signal which instructs, for example, monochrome copying, the mode signal is temporarily stored in a mode register 7301. For example, the mode signal is data having 16 bits and includes information instructing color copying or monochrome copying. The monochrome copying will be described below. The RGB/CMY conversion portion 4002 converts RGB signal into density signals using, for example, Equation 8 to output the same data for C, M and Y.

$$C, M, Y = 255 - (R+G+B)/3 \qquad \text{Equation 8}$$

The CMY/YIQ conversion portion 4005 outputs any of the CMY signal as a Y signal without using the previously described Equations 1 through 3 and outputs "0" as IQ signal, thereby generating monochrome YIQ signal in which conversion errors are ignored.

In accordance with the mode signal, the image encoding portion 4100 performs compression using tables for quantizing high density regions finely, the compression being adapted to human visual sence characteristics in the monochrome mode.

The variable length compression/decoding portion 7201 performs compression on a variable length basis by attaching the contents of the mode register 7301 (e.g., specification of monochrome or color, specification of whether the image is rotated or not, etc.) to the compressed data having a variable length and stores the result in the HDD 7203. Referring to output, the compressed data is read from the HDD 7203 and is decoded in the variable length compression/decoding portion 7201, and the resultant mode signal and the compressed data having a fixed length are stored in the mode register 7301 and the first memory 4006, respectively.

In accordance with the mode signal, the image decoding portion 4007 decodes the compressed data having a fixed length stored in the first memory 4006 using the tables.

The YIQ/CMY conversion portion 4008 directly outputs the Y signal as the CMY signal without performing CMY conversion, thereby outputting a monochrome image in the same amount as the C, M, Y on the color printer 4010 without any conversion error.

A monochrome signal including no conversion error can be generated in using shift operations represented by Equations 9 and 10 below instead of the matrix operations represented by Equations 1 through 6 for CMY-to-YIQ conversion and YIQ-to-CMY conversion.

In Equations 9 and 10, Y' represents a Y signal among YIQ signal (this reference symbol is used to distinguish this signal from a Y signal among CMY signal).

$$Y'=(C+2M+Y)/4$$

$$I=C-M$$

$$Q=M-Y \qquad \text{Equation 9}$$

$$C\ M+I$$

$$M=Y'-(I-Q)/4$$

$$Y=M-Q \qquad \text{Equation 10}$$

The mode signal may be used not only to instruct monochrome or color printing but also to adjust color balance or the like. For example, the image encoding portion 4100 can perform compression with high image quality by selecting a quantization table having the number of quantization steps corresponding to amounts for color balance adjustment included in the mode signal. The variable length compression/decoding portion 7201 compresses compressed data having a fixed length along with the mode signal input for each input image and stores the result in the HDD 7203. As a result, when a plurality of sheets are copied using, for example, electronic sorting, copying can be carried out in a different mode for each image.

Figure 45:
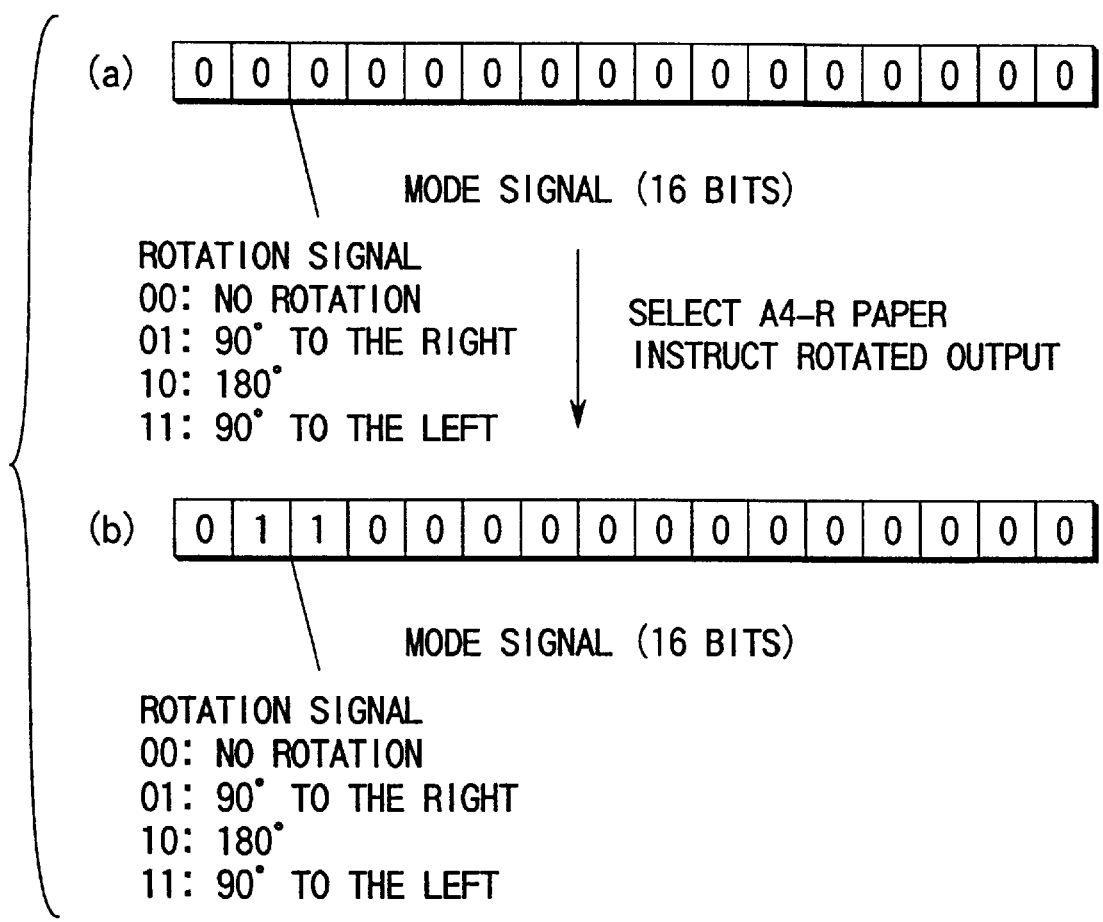
FIG. 45 is a diagram illustrating an example of the description of data associated with a process of rotating an image in a mode signal.
Figure 46A:
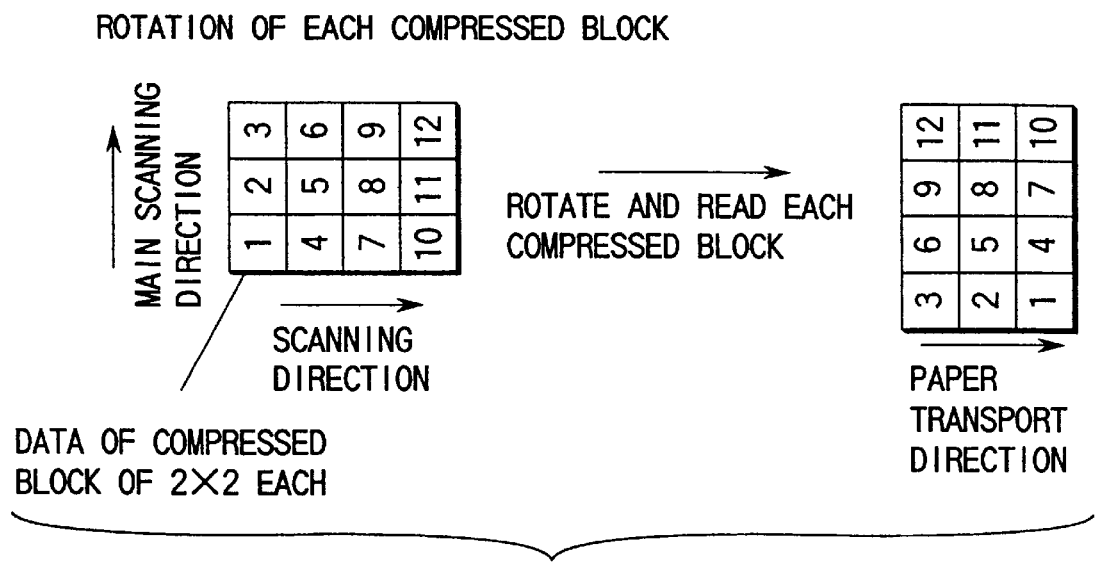
FIGS. 46A, 46B and 46C are diagrams illustrating the procedure of a process of rotating an image.
Figure 46B:
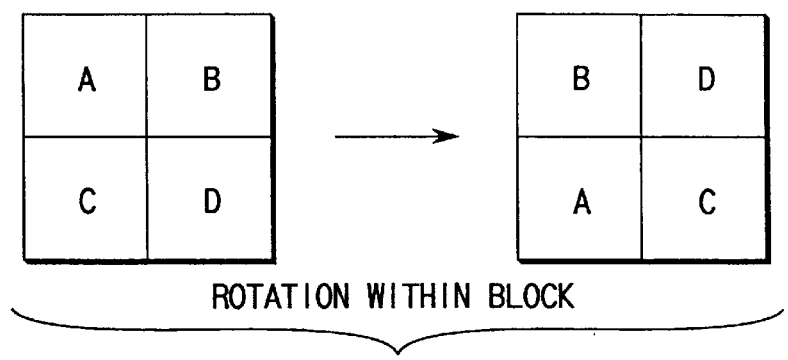
Figure 46C:
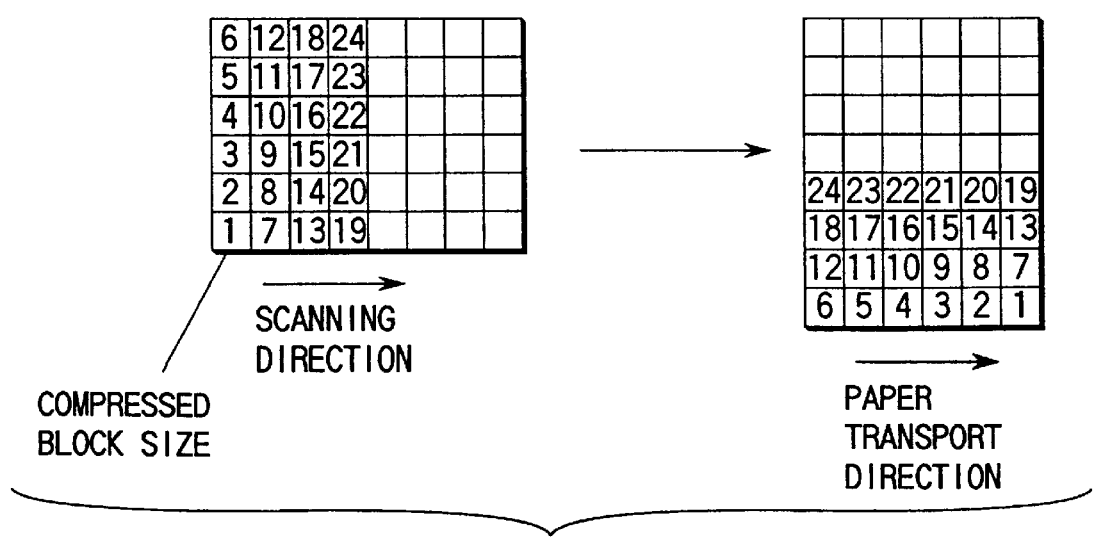

The image decoding portion 4007 may include a function of rotating an image during decoding of compressed data having a fixed length. The operation of the copier shown in FIG. 44 in this case will be briefly described. When an image is output, the variable length compression/decoding portion 7201 first reads compressed data having a variable length from the HDD 7203 and decodes it to store the resultant compressed data having a fixed length and mode signal in the first memory 4006 and mode register 7301, respectively. For example, let us assume that a paper detection portion (not shown in FIG. 44) detects that paper of A4 size in vertical placement has been used up whereas the image to be output has been input to have the size A4 and that paper of A4 size in rotated placement (A4-R) at an angle of 90° to the aforesaid vertical placement is then selected. Then, as shown in (a) on FIG. 45 bit data meaning "not rotated" in information portion of the mode signal stored in the mode register 7301 indicating whether the output image is to be rotated not is rewritten with bit data meaning "rotation at 90° to the left" as shown (b) on FIG. 45. Based on this rewritten mode signal, a memory control portion 7401 reads the data I processed blocks (compressed blocks) during compression from the first memory 4006 with the reading direction rotated and outputs the result to the image decoding portion 4007 (that is, the memory control portion 7401 rotates each compressed block) as shown in FIG. 46A. Next, as shown in FIG. 46B, the image decoding portion 4007 outputs the result of decoding with the contents of the compressed blocks (2×2 pixels) rotated during decoding. This results in a rotation of the output image as a whole at, for example, 90° as shown in FIG. 46C.

It is thus possible to rotate an image by changing the arrangement of processed blocks used during the compression of the image according to the mode signal and by changing the arrangement of the pixels in the processed blocks when the image is decoded.

While the above description has referred to a case where an image is rotated by rewriting the mode signal in order to switch the size of the paper for output in response to the detection of the absence of paper when the image is to be output, the rotation within the processed blocks may be performed by the image decoding portion 4100 and the rotation of each processed block may be performed by the memory control portion 7401 during decoding if it is known in advance the output must be rotated relative to the direction of the input.

A Seventh Embodiment

Figure 47:
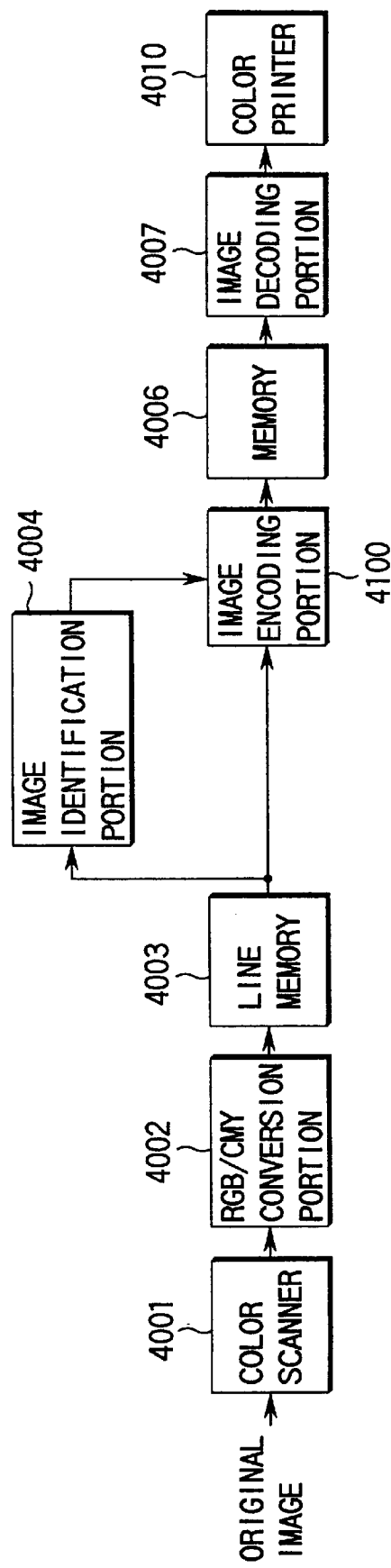
FIG. 47 is a diagram schematically illustrating an example of the configuration of major parts of a digital color copier according to a sixth embodiment of the present invention.

FIG. 47 is a block diagram schematically illustrating an example of the configuration of major parts of a digital color copier which is an image forming apparatus employing an image encoding/decoding apparatus. The apparatus comprises a color scanner 4001, an RGB/CMY conversion portion 4002, a line memory 4003, an image identification portion 4004, an image encoding portion 4100, a memory 4006, an image decoding portion 4007 and a color printer 4010. The configuration is basically the same as that shown in FIG. 24 except that the compression and decoding processes are performed on a CMY space. FIGS. 47 and 24 indicate like element using like reference numbers.

The compression process on a CMY space will now be described with reference to FIGS. 48A, 48B and 48C. FIGS. 48A and 48B shows code tables used for a compression process on C and M signals. As shown in FIGS. 48A and 48B, the resolution and the number of tones are switched for the encoding of the C and M signals depending on which the result of image identification indicates, a resolution-oriented pixel or tone-oriented pixel, as in the process on a luminance signal in the third embodiment. Alternatively, the encoding process may be carried out on the assumption that all pixels are resolution-oriented pixels without using the result of image identification. Since the resolving capability of a human being is low for a Y signal compared to C and M signals, a Y signal is encoded at a low resolution and with high tones using the code table shown in FIG. 48C.

Here, a luminance signal and C and M signals are referred to as "high resolution type image signals", and a color difference signal and a Y signal are referred to as "low resolution type image signals".

The block size for a Y signal is matched to the block size of tone-oriented pixels of C and M signals.

Figure 49:
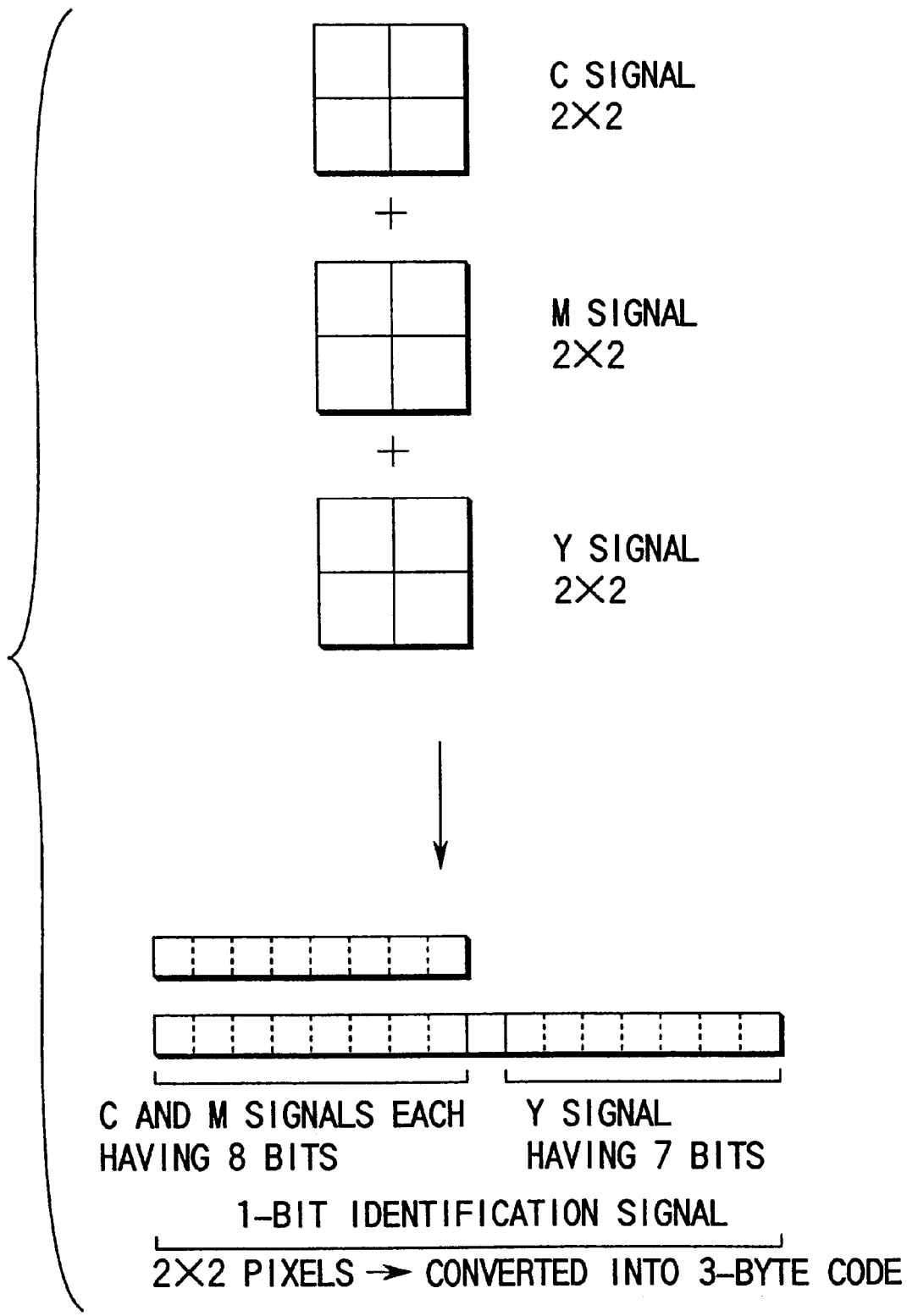
FIG. 49 is a diagram illustrating an example of the configuration of CMY signal generated in the image encoding portion into a fixed length (3 bytes) code.

As shown in FIG. 49, encoded C and M signals having 8 bits and an encoded Y signal having 7 bits generated for each block of 2×2=4 pixels are encoded along with one image identification bit into 24 bites in total which is equal to 3 bytes. Specifically, since each of the CMY signal for one block consisting of 2×2=4 pixels has 8 bits, 96 bits in total are compressed into 24 bits. The encoding as shown in FIGS. 48A, 48B and 48C allows a simple configuration which less compromises resolution compared to a method of compression involving conversion into luminance and color difference signals, although a compression ratio of 24/96 achieved here is equivalent to that achieved by the quadruple value error diffusion disclosed in article described in the section of the background of the invention. In addition, since this encoding is adaptable to the characteristics of an image, compression can be achieved with higher image quality than the prior art. Further, sine the encoding is performed including the image identification signal, output of higher image quality can be obtained compared to the prior art by switching the methods of output at the color printer 4010.

As described above, the present invention makes it possible to perform encoding on a fixed length basis with a high compression ratio while suppressing deterioration of image quality.

In image processing apparatuses such as printers, copiers, facsimile machines and displays for outputting multi-value image data through an image memory and a transmission path, encoding efficiency is improved to save the capacity of the memory, to increase the amount of image information which can be stored with a limited memory capacity and to improve the transmission speed.

In addition, since the characteristics of an image signal are encoded, decoded signals can be output in adaptation to the image characteristics to improve image quality on the output device.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    storing means for storing image information;
    identification means for identifying types of images from the stored image information;
    determination means for determining resolution and the number of quantization steps in accordance with the result of identification; and
    quantization means for quantizing the image information into a certain value through an error diffusion process on at least one of the types of images based on the resolution and number of quantization steps determined by the determination means.

2. An image processing apparatus according to claim 1, further comprising:
    decoding means for decoding the quantized image information quantized by the quantization means to output decoded image information; and
    means for correcting the decoded image information.

3. An image processing apparatus according to claim 1, wherein the quantization means includes:
    quantization means for correcting and quantizing the image information so that a color signal would form a color image and monochrome signal would form a monochrome image.

4. An image processing apparatus according to claim 1, wherein the quantization means includes:
    quantization means for quantizing the more precisely a color difference signal the more closer to a monochrome signal.

5. An image processing apparatus according to claim 1, further comprising:
    first storage means for storing an operation mode signal;
    second storage means for storing the quantized image information quantized by the quantization means along with the operation mode signal stored in the first storage means; and
    means for reading the quantized image information and the operation mode signal stored in the second storage means, decoding the quantized image information and performing a process indicated by the operation mode signal on the decoded quantized image information.

6. An image forming apparatus comprising:
    storing means for storing image information;
    identification means for identifying types of images from the stored image information;
    determination means for determining resolution and the number of quantization steps in accordance with the result of identification;
    resolution reduction means for converting the image information into brightness and color signal and for reducing the resolutions of a component signal of the brightness and color signal; and
    quantization means for quantizing the image information using an error diffusion process on the component signal at the reduced resolution with respect to at least one type of image based on the resolution and the number of quantization steps determined by the determination means.

7. An image forming apparatus comprising:
    storing means for storing image information;
    identification means for identifying types of images from the stored image information;
    determination means for determining resolution and the number of quantization steps in accordance with the result of identification;
    quantization means for quantizing the image information into a certain value through an error diffusion process on at least one of the types of images based on the resolution and number of quantization steps determined by the determination means; and
    demodulation means for separating the certain value to a brightness signal and a color difference signal and demodulating the certain value corresponding to at least one of the brightness signal and the color difference signal and a characteristic of the image information, the demodulation means demodulates the certain value to a signal within an area for capable of reproduce while demodulation by using of one of the brightness signal and the color difference signal.

8. An image forming apparatus comprising:
    storing means for storing image information;
    identification means for identifying types of images from the stored image information;
    determination means for determining resolution and the number of quantization steps in accordance with the result of identification;
    resolution reduction means for converting the image information into CMY signal and for reducing the resolution of the CMY signal; and
    quantization means for quantizing the image information by using an error diffusion process on the CMY signal whose resolution has been reduced by the resolution reduction means with respect to at least one type of image based on the resolution and the number of quantization steps determined by the determination means.

9. An image forming apparatus comprising:
    scanner means for acquiring color image information;
    identification means for identifying the image types of the color image information acquired by the scanner means;
    determination means for determining the resolutions and the numbers of quantization steps in accordance with the result of the identification;
    quantization means for quantizing the color image signal by using an error diffusion process on at least one type of image based on the resolution and the number of quantization steps;
    decoding means for decoding the color image information quantized by the quantization means; and a color printer portion for forming a color image based on the decoded color image information decoded by the decoding means.

10. An image processing method comprising the steps of:

identifying the type of an image from acquired image information;

determining resolution and the number of quantization steps in accordance with the result of identification; and quantizing the image information through an error diffusion process on at least one of the types of images based on the resolution and number of quantization steps determined at the determination step.

11. An image forming apparatus comprising:

storing means for storing image information;

identification means for identifying types of images from the stored image information;

determination means for determining resolution and the number of quantization steps in accordance with the result of identification; and quantization means for quantizing the image information into a certain value based on the resolution and number of quantization steps determined by the determination means.

* * * * *